(12) United States Patent
Zhang

(10) Patent No.: US 11,343,813 B2
(45) Date of Patent: May 24, 2022

(54) METHOD AND DEVICE IN UE AND BASE STATION USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 84 days.

(21) Appl. No.: 16/903,389

(22) Filed: Jun. 17, 2020

(65) Prior Publication Data

US 2020/0337030 A1 Oct. 22, 2020

Related U.S. Application Data

(63) Continuation of application No. PCT/CN2017/118540, filed on Dec. 26, 2017.

(30) Foreign Application Priority Data

Dec. 22, 2017 (WO) ................ PCT/CN2017/118084

(51) Int. Cl.
*H04W 72/04* (2009.01)
*H04W 16/14* (2009.01)

(52) U.S. Cl.
CPC ......... *H04W 72/042* (2013.01); *H04W 16/14* (2013.01)

(58) Field of Classification Search
CPC .................................................. H04W 72/042
See application file for complete search history.

(56) References Cited

U.S. PATENT DOCUMENTS

2016/0278125 A1 9/2016 Liao et al.
2016/0338054 A1* 11/2016 Oh .................... H04W 74/0841
(Continued)

FOREIGN PATENT DOCUMENTS

CN 104811262 A 7/2015
CN 105282855 A 1/2016
(Continued)

OTHER PUBLICATIONS

First Office Action received in application No. IN202017028981 dated Jun. 30, 2021.
(Continued)

*Primary Examiner* — John D Blanton

(57) ABSTRACT

The present disclosure discloses a UE and a base station used for wireless communications. The UE receives Q control signaling groups respectively in Q time windows; receives a first control signaling that is used for determining Q1 time window(s) out of the Q time windows; and performs energy detection to determine whether to transmit on a first time-frequency resource; herein, any of the Q control signaling groups comprises a first field; any control signaling comprised by the Q control signaling groups comprises a first field; first fields comprised by control signalings in any of the Q control signaling groups are of a same value; among any Q2 adjacent control signaling groups of the Q control signaling groups, any two control signaling groups comprise first fields of different values; the first radio signal comprises first feedback information. The present disclosure not only ensures HARQ-ACK transmission but reduces signaling overhead redundancy.

20 Claims, 17 Drawing Sheets

(56) References Cited

U.S. PATENT DOCUMENTS

2017/0142740 A1* 5/2017 Gou ................. H04W 72/0446
2019/0159251 A1* 5/2019 Li ............................ H04L 1/18

FOREIGN PATENT DOCUMENTS

| CN | 105827377 A | 8/2016 |
| CN | 106603210 A | 4/2017 |
| CN | 107113867 A | 8/2017 |
| CN | 107332646 A | 11/2017 |

OTHER PUBLICATIONS

ISR received in application No. PCT/CN2017/118540 dated Jun. 5, 2018.

* cited by examiner

METHOD AND DEVICE IN UE AND BASE STATION USED FOR WIRELESS COMMUNICATION

CROSS REFERENCE TO RELATED APPLICATIONS

This application is a continuation of International Application No. PCT/CN2017/118540, filed Dec. 26, 2017, claims the priority benefit of International Chinese Patent Application No. PCT/CN2017/118084, filed on Dec. 22, 2017, the full disclosure of which is incorporated herein by reference.

BACKGROUND

Technical Field

The present disclosure relates to transmission methods and devices in wireless communication systems, and in particular to a communication method and device supporting data transmission on Unlicensed Spectrum.

Related Art

As future application scenarios of wireless communication systems become increasingly diversified, varying performance requirements have been posed on the systems. In order to meet such performance requirements of various application scenarios, a study item of access to Unlicensed Spectrum under NR was approved at the $3^{rd}$ Generation Partner Project (3GPP) Radio Access Network (RAN) #$75^{th}$ plenary session.

In Long Term Evolution (LTE) Licensed Assisted Access (LAA), a transmitter (i.e., a base station or a User Equipment) shall first perform Listen Before Talk (LBT) before transmitting data on Unlicensed Spectrum so as to ensure that no interference will be caused to other ongoing wireless transmissions on the Unlicensed Spectrum. In the process of Cat 4 LBT (refer to 3GPP TR36.889), the transmitter also will experience backoff after a certain defer duration and the time length of the backoff is calculated based on slot durations in a Clear Channel Assessment (CCA). The number of slot durations in the backoff is obtained through the transmitter's random selection of Contention Window Size (CWS). For downlink transmission, the CWS is adjusted according to a Hybrid Automatic Repeat reQuest (HARQ) feedback corresponding to data comprised in a reference sub-frame previously transmitted on the Unlicensed Spectrum. While for uplink transmission, the CWS is adjusted according to whether there is new data in data comprised in a reference sub-frame previously transmitted on the Unlicensed Spectrum.

In the existing NR system, Downlink Grant Downlink Control Information (DCI) comprises a Downlink Assignment Index (DAI) field, which is used to support codebook-based HARQ-ACK.

SUMMARY

Inventors find through researches that in LAA communications, particularly in StandAlone (SA)-LAA communications, a User Equipment (UE) has to perform LBT before transmitting an uplink HARQ-ACK, so there is much uncertainty about the transmission time for uplink HARQ-ACK, and how to transmit uplink HARQ-ACK in LAA communications becomes a problem that needs solving.

To address the above problem, the present disclosure provides a solution. It should be noted that the embodiments of the present disclosure and the characteristics in the embodiments may be mutually combined if no conflict is incurred. Further, though originally targeted at LAA communications, the method and device in the present disclosure are also applicable to communications on Licensed Spectrum.

The present disclosure provides a method in a UE for wireless communications, comprising:

receiving Q control signaling groups respectively in Q time windows, any of the Q control signaling groups comprising a positive integer number of control signaling(s);

receiving a first control signaling, the first control signaling indicating Q1 time window(s) out of the Q time windows; and performing energy detection so as to determine whether to perform a transmission on a first time-frequency resource; if yes, a first radio signal is transmitted in the first time-frequency resource, otherwise a transmission of the first radio signal is dropped in the first time-frequency resource;

herein, any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

In one embodiment, the above method enables the base station to dynamically configure a time window associated with the first radio signal and used for transmitting downlink data, thus ensuring that a HARQ-ACK dropped due to LBT will be transmitted with a delay.

In one embodiment, the above method enables the base station to dynamically configure a time window associated with the first radio signal and used for transmitting downlink data, thereby triggering a retransmission of a HARQ-ACK which failed to be correctly received.

In one embodiment, the above first field can index a position of a HARQ-ACK bit for a corresponding time window in the first feedback information to avoid possible confusion.

In one embodiment, the above first field can index a corresponding time window rather than slots in a corresponding time window, thus reducing signaling redundancy the first field may incur.

In one embodiment, the Q control signaling groups and the first control signaling are transmitted on Unlicensed Spectrum.

In one embodiment, the first radio signal is transmitted on Unlicensed Spectrum.

Specifically, according to one aspect of the present disclosure, comprising:

receiving Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), wherein the positive integer number of radio signal(s) respectively corresponds (correspond) to bit block(s) comprised in a corresponding bit block group;

herein, the bit blocks transmitted in the Q1 time window(s) comprise Q1 bit block group(s) of the Q bit block groups, the Q1 bit block groups(s) is(are) respectively transmitted in the Q1 time window(s).

In one embodiment, the Q control signaling groups respectively correspond to the Q radio signal groups, all control signalings comprised in a control signaling group respectively correspond to all radio signals comprised in a corresponding radio signal group, a control signaling comprises configuration information of a corresponding radio signal, and the configuration information comprises at least one of occupied time-domain resources, occupied frequency-domain resources, a Modulation and Coding Status (MCS), a Redundancy Version (RV) or a New Data Indicator (NDI).

In one embodiment, a bit block in the Q bit block groups comprises at least one Transport Block (TB).

In one embodiment, a bit block in the Q bit block groups comprises at least one Code Block Group (CBG).

Specifically, according to one aspect of the present disclosure, the first control signaling is used for determining at least the first time-frequency resource between the first time-frequency resource and configuration information of the first radio signal, the configuration information comprises at least one of an MCS, an RV, an NDI or a reception parameter set.

In one embodiment, the above method enables the base station to dynamically configure time-frequency resources occupied by the first radio signal, thus enhancing the flexibility of scheduling.

In one embodiment, the above method enables the base station to trigger the first radio signal at the earliest possible time, thus reducing delay in HARQ-ACK feedback.

In one embodiment, the reception parameter set comprises one or more of a receiving beam, a receive beamforming matrix, a receive analog beamforming vector, a receive beamforming vector and a receive spatial filtering.

In one embodiment, the reception parameter set comprises Spatial Rx parameters.

In one embodiment, the reception parameter set comprises configurations relevant to a DeModulation Reference Signal (DMRS).

In one embodiment, the first radio signal explicitly indicates the first time-frequency resource and configuration information of the first radio signal.

In one embodiment, the first radio signal implicitly indicates the first time-frequency resource and configuration information of the first radio signal.

In one embodiment, the first radio signal comprises a first bit block other than the first feedback information.

In one embodiment, a transmission channel for the first bit block is an Uplink Shared Channel (UL-SCH).

Specifically, according to one aspect of the present disclosure, if a number of the bit blocks transmitted in the Q1 time window(s) does not exceed a first threshold, it is indicated by one bit in the first feedback information whether each of the bit blocks transmitted in the Q1 time window(s) is correctly decoded; otherwise it is indicated by one bit in the first feedback information whether at least two bit blocks of the bit blocks transmitted in the Q1 time window(s) are correctly decoded through a way of bundling; any two of the bit blocks transmitted in the Q1 time window(s) correspond to different transport blocks or code block groups.

In one embodiment, the above method can determine a number of bits occupied by the first feedback information in advance, so as to avoid reserving excess or insufficient radio resources for the first feedback information.

In one embodiment, when all bit blocks associated with a given bit through bundling are correctly decoded, the given bit is set as ACK by the UE, otherwise the given bit is set as NACK by the UE.

In one embodiment, the phrase that any two of the bit blocks transmitted in the Q1 time window(s) correspond to different transport blocks or code block groups means that bits in any two of the bit blocks transmitted in the Q1 time window(s) do not belong to a same code block group (CBG).

In one embodiment, the phrase that any two of the bit blocks transmitted in the Q1 time window(s) correspond to different transport blocks or code block groups means that bits in any two of the bit blocks transmitted in the Q1 time window(s) do not belong to a same transport block (TB).

In one embodiment, any bit block of the bit blocks transmitted in the Q1 time window(s) comprises at least one TB.

In one embodiment, any bit block of the bit blocks transmitted in the Q1 time window(s) comprises at least one CBG.

In one embodiment, the first threshold is dependent on a number of Resource Elements (REs) occupied by the first time-frequency resource, of which each RE occupies a subcarrier in frequency domain and a multicarrier symbol in time domain.

In one embodiment, the first threshold depends on a channel type to which the first time-frequency resource belongs.

In one embodiment, if the first time-frequency resource belongs to a first channel type, the first threshold is a first candidate value; if the first time-frequency resource belongs to a second channel type, the first threshold is a second candidate value.

In one embodiment, the first channel type and the second channel type are respectively Physical Uplink Control Channel (PUCCH) and Physical Uplink Shared Channel (PUSCH).

In one embodiment, the first channel type and the second channel type are two different types of PUCCH.

Specifically, according to one aspect of the present disclosure, the first feedback information comprises Q1 field(s), each of the Q1 field(s) comprises an equal number of bits, the Q1 field(s) respectively corresponds(correspond) to the Q1 time window(s), and each of the Q1 field(s) is used for determining whether bit block(s) transmitted in a corresponding time window is(are) correctly decoded.

In one embodiment, the above method can determine a number of bits and respective positions of the bits in the first feedback information associated with each time window, thereby avoiding confusion.

In one embodiment, the above method prevents a situation where a downlink signaling is used to indicate for each time window the number of bits associated with each time window and respective positions of the bits, hence a decrease in downlink signaling overhead.

In one embodiment, a number of slots in a time window is undeterminable in LAA communications; as a brief extension of a current proposal of Time Division Duplex (TDD) in Long Term Evolution (LTE), there is need to reserve radio resources based on a largest possible number of slots, which leads to less efficient transmission; however, the above method disconnect the number of bits reserved from the number of slots in the time window, thereby enhancing the transmission efficiency.

In one embodiment, the number of bits in each of the Q1 field(s) is fixed.

In one embodiment, the number of bits in each of the Q1 field(s) is 1.

In one embodiment, if a number of bit blocks transmitted in a given time window is greater than 1, then a corresponding field of the Q1 field(s) indicates through bundling whether all bit blocks transmitted in the given time window are correctly decoded.

In one embodiment, the number of bits in each of the Q1 field(s) is configurable.

In one embodiment, the number of bits in each of the Q1 field(s) is semi-statically configured.

In one embodiment, the number of bits in each of the Q1 field(s) is dynamically configured.

In one embodiment, the number of bits in each of the Q1 field(s) is dependent on a channel type to which the first time-frequency resource belongs.

In one embodiment, if the first time-frequency resource belongs to a first channel type, then the number of bits in each of the Q1 field(s) is a third candidate value; if the first time-frequency resource belongs to a second channel type, then the number of bits in each of the Q1 field(s) is a fourth candidate value;

In one embodiment, the first channel type and the second channel type are respectively PUCCH and PUSCH.

In one embodiment, the first channel type and the second channel type are two different types of PUCCH.

In one embodiment, for each field of the Q1 field(s), if a number of bits comprised is less than that of bit blocks transmitted in a corresponding time window, then at least two bit blocks transmitted in the corresponding time window are bundled by one bit to indicate whether these two bits are correctly decoded; otherwise bit blocks in the corresponding time window are respectively indicated by one bit whether these bit blocks are correctly decoded.

Specifically, according to one aspect of the present disclosure, the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

In one embodiment, the Q1 field(s) each comprises(comprise) an equal number of bits.

The above embodiment strikes a balance between overhead of a downlink signaling and overhead of an uplink signaling, so that transmission efficiency is optimized.

Specifically, according to one aspect of the present disclosure, the first control signaling is transmitted in a first time window, the first control signaling comprises a second field, and the second field in the first control signaling is used for determining at least one of the following:

An accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

a total number of {serving cell, PDCCH monitoring occasion}-pair(s) comprising DCI of a target format up to a current PDCCH monitoring occasion in the first time window.

In one embodiment, the second field is a DAI field.

In one embodiment, the second field is composed of 4 bits.

In one embodiment, the first control signaling is Uplink (UL) Grant DCI.

In one embodiment, the first time window is a latest time window among the Q time windows.

In one embodiment, the first time window is a latest time window among the Q1 time windows.

In one embodiment, the first time window is a time window outside the Q time windows.

In one subembodiment, there is at least one unoccupied multicarrier symbol between the first time window and a latest time window among the Q time windows.

In one embodiment, the present serving cell and the present PDCCH Occasion are respectively a serving cell carrying the first control information and a PDCCH Occasion carrying the first control information.

In one embodiment, the downlink control information of the target format refers to Downlink (DL) Grant DCI detected by the UE.

In one embodiment, the downlink control information of the target format comprises non-UL Grant DCI detected by the UE.

In one embodiment, the DL Grant DCI comprises DCI format 1_0 and DCI format 1_1.

The present disclosure provides a method in a base station for wireless communications, comprising:

transmitting Q control signaling groups respectively in Q time windows, any of the Q control signaling groups comprising a positive integer number of control signaling(s);

transmitting a first control signaling, the first control signaling indicating Q1 time window(s) out of the Q time windows; and monitoring a first radio signal on a first time-frequency resource;

herein, any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

In one embodiment, the base station determines through blind detection whether the first radio signal exists in the first time-frequency resource.

In one embodiment, the blind detection comprises energy detection.

In one embodiment, the blind detection comprises detecting a characteristic sequence.

In one embodiment, the first feedback information comprises one or more check bits, and the base station performs channel decoding based on a radio signal received on the first time-frequency resource; if an output from the channel decoding passes the check by the one or more check bits, the base station deems that the first feedback information is correctly received; otherwise the base station deems that the first feedback information fails to be correctly received.

Specifically, according to one aspect of the present disclosure, comprising:

transmitting Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), wherein the positive integer number of radio signal(s) respectively corresponds(correspond) to bit block(s) comprised in a corresponding bit block group;

herein, the bit blocks transmitted in the Q1 time window(s) comprise Q1 bit block group(s) of the Q bit block groups, the Q1 bit block groups(s) is(are) respectively transmitted in the Q1 time window(s).

Specifically, according to one aspect of the present disclosure, the first control signaling is used for determining at least the first time-frequency resource between the first time-frequency resource and configuration information of the first radio signal, the configuration information comprises at least one of an MCS, a Redundancy Version (RV), a New Data Indication (NDI) or a reception parameter set.

Specifically, according to one aspect of the present disclosure, if a number of the bit blocks transmitted in the Q1 time window(s) does not exceed a first threshold, it is indicated by one bit in the first feedback information whether each of the bit blocks transmitted in the Q1 time window(s) is correctly decoded; otherwise it is indicated by one bit in the first feedback information whether at least two bit blocks of the bit blocks transmitted in the Q1 time window(s) are correctly decoded through a way of bundling; any two bit blocks of the bit blocks transmitted in the Q1 time window(s) correspond to different transport blocks or code block groups.

Specifically, according to one aspect of the present disclosure, the first feedback information comprises Q1 field(s), each of the Q1 field(s) comprises an equal number of bits, the Q1 field(s) respectively corresponds(correspond) to the Q1 time window(s), and each of the Q1 field(s) is used for determining whether bit block(s) transmitted in a corresponding time window is(are) correctly decoded.

Specifically, according to one aspect of the present disclosure, the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

Specifically, according to one aspect of the present disclosure, the first control signaling is transmitted in a first time window, the first control signaling comprises a second field, and the second field in the first control signaling is used for determining at least one of the following:

An accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

a total number of {serving cell, PDCCH monitoring occasion}-pair(s) comprising DCI of a target format up to a current PDCCH monitoring occasion in the first time window.

The present disclosure provides a UE for wireless communications, comprising:

a first receiver: receiving Q control signaling groups respectively in Q time windows, any of the Q control signaling groups comprising a positive integer number of control signaling(s); and receiving a first control signaling, the first control signaling indicating Q1 time window(s) out of the Q time windows;

a first transmitter: performing energy detection so as to determine whether to perform a transmission on a first time-frequency resource; if yes, a first radio signal is transmitted in the first time-frequency resource, otherwise a transmission of the first radio signal is dropped in the first time-frequency resource;

herein, any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

In one embodiment, the above UE for wireless communications is characterized in that the first receiver receives Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), and the positive integer number of radio signal(s) respectively corresponds(correspond) to bit block(s) comprised in a corresponding bit block group; herein, the bit blocks transmitted in the Q1 time window(s) comprise Q1 bit block group(s) of the Q bit block groups, and the Q1 bit block groups(s) is(are) respectively transmitted in the Q1 time window(s).

In one embodiment, the above UE for wireless communications is characterized in that the first control signaling is used for determining at least the first time-frequency resource between the first time-frequency resource and configuration information of the first radio signal, the configuration information comprises at least one of an MCS, an RV, an NDI or a reception parameter set.

In one embodiment, the above UE for wireless communications is characterized in that if a number of the bit blocks transmitted in the Q1 time window(s) does not exceed a first threshold, it is indicated by one bit in the first feedback information whether each of the bit blocks transmitted in the Q1 time window(s) is correctly decoded; otherwise it is indicated by one bit in the first feedback information whether at least two bit blocks of the bit blocks transmitted in the Q1 time window(s) are correctly decoded through a way of bundling; any two bit blocks of the bit blocks transmitted in the Q1 time window(s) correspond to different transport blocks or code block groups.

In one embodiment, the above UE for wireless communications is characterized in that the first feedback information comprises Q1 field(s), each of the Q1 field(s) comprises an equal number of bits, the Q1 field(s) respectively corresponds(correspond) to the Q1 time window(s), and each of the Q1 field(s) is used for determining whether bit block(s) transmitted in a corresponding time window is(are) correctly decoded.

In one embodiment, the above UE for wireless communications is characterized in that the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

In one embodiment, the above UE for wireless communications is characterized in that the first control signaling is transmitted in a first time window, the first control signaling comprises a second field, and the second field in the first control signaling is used for determining at least one of the following:

An accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

a total number of {serving cell, PDCCH monitoring occasion}-pair(s) comprising DCI of a target format up to a current PDCCH monitoring occasion in the first time window.

The present disclosure provides a base station for wireless communications, comprising:

a second transmitter: transmitting Q control signaling groups respectively in Q time windows, any of the Q control signaling groups comprising a positive integer number of control signaling(s); and transmitting a first control signaling, the first control signaling indicating Q1 time window(s) out of the Q time windows;

a second receiver: monitoring a first radio signal on a first time-frequency resource;

herein, any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

In one embodiment, the above base station for wireless communications is characterized in that the second transmitter transmits Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), and the positive integer number of radio signal(s) respectively corresponds (correspond) to bit block(s) comprised in a corresponding bit block group; herein, the bit blocks transmitted in the Q1 time window(s) comprise Q1 bit block group(s) of the Q bit block groups, the Q1 bit block groups(s) is(are) respectively transmitted in the Q1 time window(s).

In one embodiment, the above base station for wireless communications is characterized in that the first control signaling is used for determining at least the first time-frequency resource between the first time-frequency resource and configuration information of the first radio signal, the configuration information comprises at least one of an MCS, an RV, an NDI or a reception parameter set.

In one embodiment, the above base station for wireless communications is characterized in that if a number of the bit blocks transmitted in the Q1 time window(s) does not exceed a first threshold, it is indicated by one bit in the first feedback information whether each of the bit blocks transmitted in the Q1 time window(s) is correctly decoded; otherwise it is indicated by one bit in the first feedback information whether at least two bit blocks of the bit blocks transmitted in the Q1 time window(s) are correctly decoded through a way of bundling; any two bit blocks of the bit blocks transmitted in the Q1 time window(s) correspond to different transport blocks or code block groups.

In one embodiment, the above base station for wireless communications is characterized in that the first feedback information comprises Q1 field(s), each of the Q1 field(s) comprises an equal number of bits, the Q1 field(s) respectively corresponds(correspond) to the Q1 time window(s), and each of the Q1 field(s) is used for determining whether bit block(s) transmitted in a corresponding time window is(are) correctly decoded.

In one embodiment, the above base station for wireless communications is characterized in that the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

In one embodiment, the above base station for wireless communications is characterized in that the first control signaling is transmitted in a first time window, the first control signaling comprises a second field, and the second field in the first control signaling is used for determining at least one of the following:

An accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

a total number of {serving cell, PDCCH monitoring occasion}-pair(s) comprising DCI of a target format up to a current PDCCH monitoring occasion in the first time window.

In one embodiment, the present disclosure has the following advantages over prior art:

ensuring that a HARQ-ACK dropped due to LBT can be transmitted with a delay;

the base station capable of dynamically configuring a time window associated with the first radio signal and used for transmitting downlink data, thereby triggering a retransmission of a HARQ-ACK which failed to be received correctly;

avoiding confusion;

reducing signaling redundancy;

balancing the overhead of downlink signaling and the uplink signaling to improve transmission efficiency;

and increasing the flexibility of scheduling and latency of HARQ-ACK feedback.

BRIEF DESCRIPTION OF THE DRAWINGS

Other features, objects and advantages of the present disclosure will become more apparent from the detailed description of non-restrictive embodiments taken in conjunction with the following drawings.

EMBODIMENT 1

Figure 1:
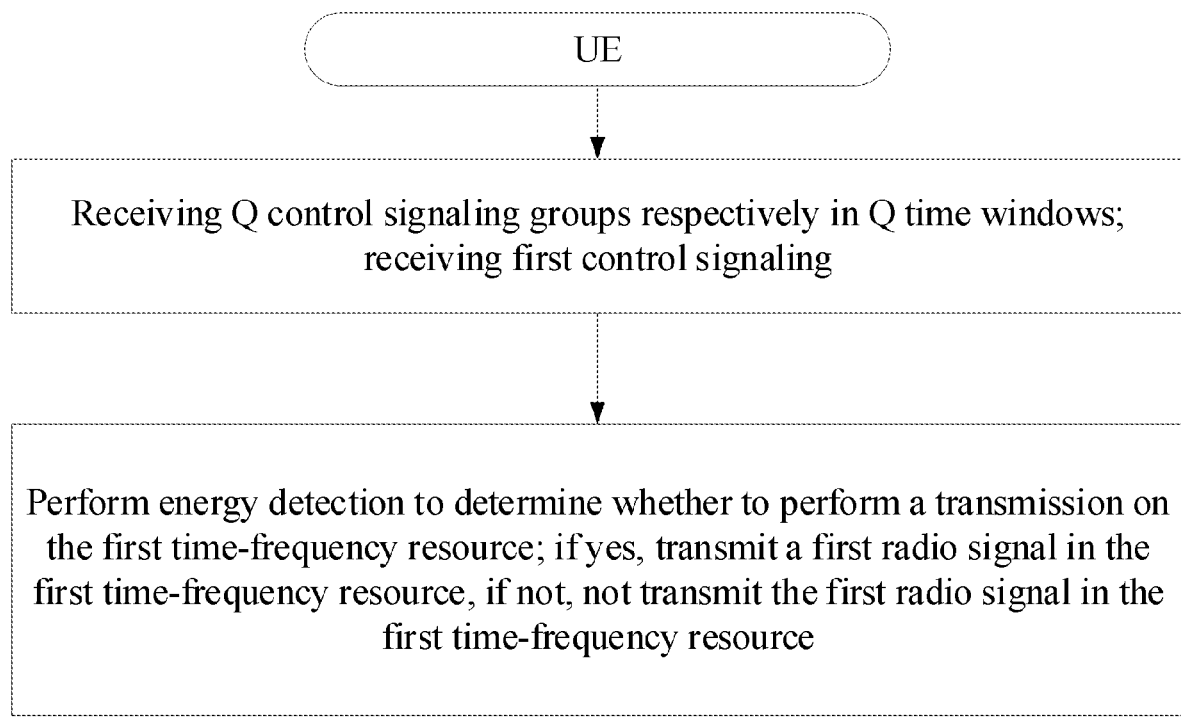
FIG. 1 illustrates a flowchart of processing at UE side according to one embodiment of the present disclosure.

Embodiment 1 illustrates a flowchart of processing at UE side, as shown in FIG. 1.

In Embodiment 1, the UE receives Q control signaling groups respectively in Q time windows, and receives a first control signaling, herein any of the Q control signaling groups comprising a positive integer number of control signaling(s), and the first control signaling indicating Q1 time window(s) out of the Q time windows; the UE performs energy detection so as to determine whether to perform a transmission on a first time-frequency resource; if yes, a first radio signal is transmitted in the first time-frequency resource, otherwise a transmission of the first radio signal is dropped in the first time-frequency resource.

In Embodiment 1, any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

In one embodiment, any control signaling in any control signaling group among the Q control signaling groups is a piece of DCI.

In one embodiment, the first field comprises 2 bits.

In one embodiment, the first field comprises 3 bits.

In one embodiment, the first field comprises 4 bits.

In one embodiment, any two of the Q time windows are orthogonal.

In one embodiment, the bit block belongs to a TB.

In one embodiment, the bit block is a CBG.

In one embodiment, the bit block comprises a plurality of bits.

In one embodiment, there is at least one unoccupied multicarrier symbol in between any two time windows of the Q time windows.

In one embodiment, a monitoring on a downlink signaling of a specific type can be used for determining whether one or more multicarrier symbols are occupied.

In one embodiment, the downlink signaling of a specific type is DCI identified by a Common Channel Radio Network Temporary Identifier (CC-RNTI).

In one embodiment, if the downlink signaling of a specific type can be detected and the downlink signaling of the specific type indicates that one or more multicarrier symbols are occupied, then the UE assumes that the one or more multicarrier symbols are occupied, otherwise, the UE assumes that the one or more multicarrier symbols are unoccupied.

In one embodiment, the Q1 time window(s) is(are) Q1 latest time window(s) among the Q time windows.

In one embodiment, a first multicarrier symbol and a second multicarrier symbol are respectively an earliest multicarrier symbol and a latest multicarrier symbol in the Q time windows, and between the first multicarrier symbol and the second multicarrier symbol there does not exist an occupied multicarrier symbol outside the Q time windows.

In one embodiment, control signalings comprised in the Q control signaling groups are all cell-common.

In one embodiment, control signalings comprised in the Q control signaling groups are all UE-specific.

In one embodiment, the first control signaling is transmitted in a latest one of the Q time windows.

In one embodiment, the first radio signal is transmitted on a physical layer data channel.

In one embodiment, the physical layer data channel is a physical layer channel capable of carrying physical layer data.

In one embodiment, the physical layer data channel is a PUSCH.

In one embodiment, the physical layer data channel is a shorten PUSCH (sPUSCH).

In one embodiment, the first radio signal is transmitted on a physical layer control channel.

In one embodiment, the physical layer control channel is a physical layer channel only capable of carrying a physical layer control signaling.

In one embodiment, the physical layer control channel is a PUCCH.

In one embodiment, the physical layer control channel is a shortern PUCCH (sPUCCH).

In one embodiment, the first control signaling is UL Grant DCI.

In one embodiment, the first control signaling is DL Grant DCI.

In one embodiment, each of the Q control signaling groups is transmitted on Unlicensed Spectrum.

In one embodiment, all control signalings comprised in any control signaling group of the Q control signaling groups are transmitted on a same carrier.

In one embodiment, among the Q control signaling groups there are at least two control signaling groups transmitted respectively on two carriers.

In one embodiment, all control signalings comprised in any control signaling group of the Q control signaling groups are transmitted on a same serving cell.

In one embodiment, among the Q control signaling groups there are at least two control signaling groups transmitted respectively on two serving cells.

In one embodiment, the first time-frequency resource comprises a plurality of REs, of which each RE occupies a multicarrier symbol in time domain and a subcarrier in frequency domain.

EMBODIMENT 2

Figure 2:
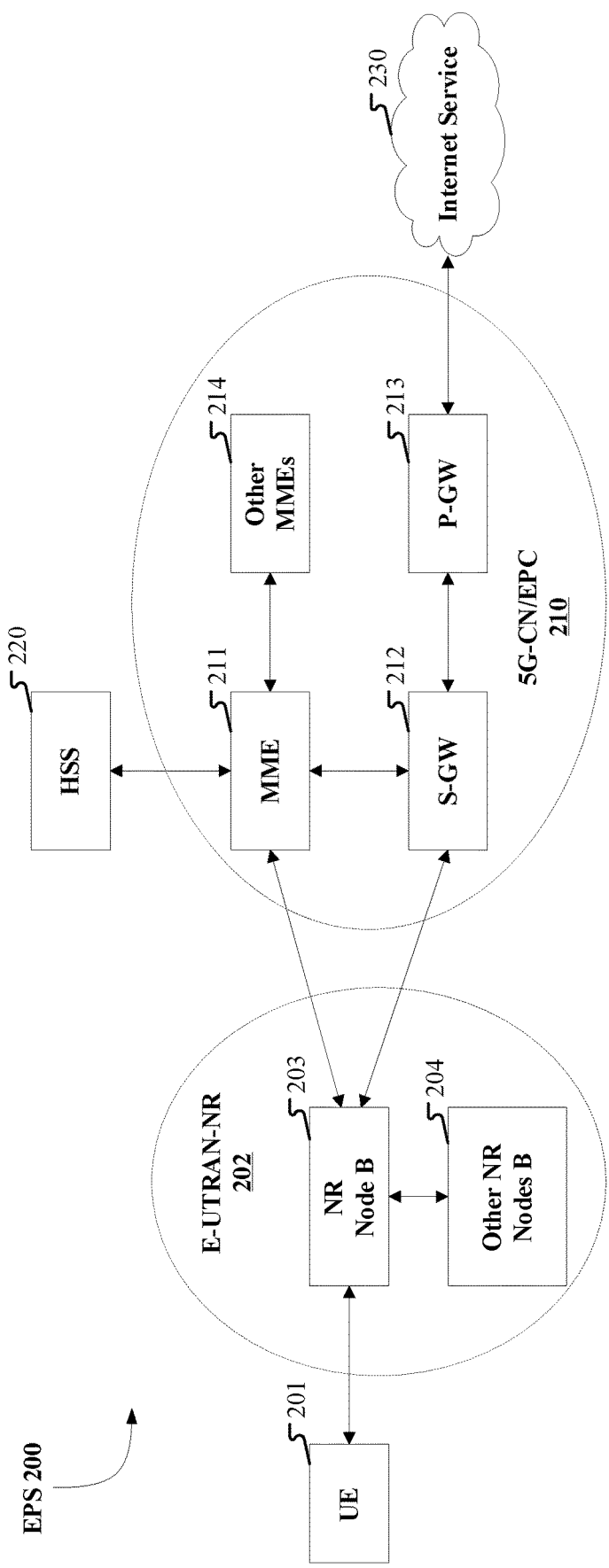
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200, which may comprise one or more UEs 201, an Evolved UMTS Terrestrial Radio Access Network New Radio (E-UTRAN-NR) 202, a 5G-Core Network/ Evolved Packet Core (5G-CN/EPC) 210, a Home Subscriber Server (HSS) 220 and an Internet Service 230, herein the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity (MME) 211, other MMES 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB 203 corresponds to the base station in the present disclosure.

In one embodiment, the UE 201 supports wireless communications where data is transmitted on Unlicensed Spectrum.

In one embodiment, the gNB 203 supports wireless communications where data is transmitted on Unlicensed Spectrum.

In one embodiment, the UE 201 supports CBG-based HARQ retransmission.

In one embodiment, the gNB 203 supports CBG-based HARQ retransmission.

EMBODIMENT 3

Figure 3:
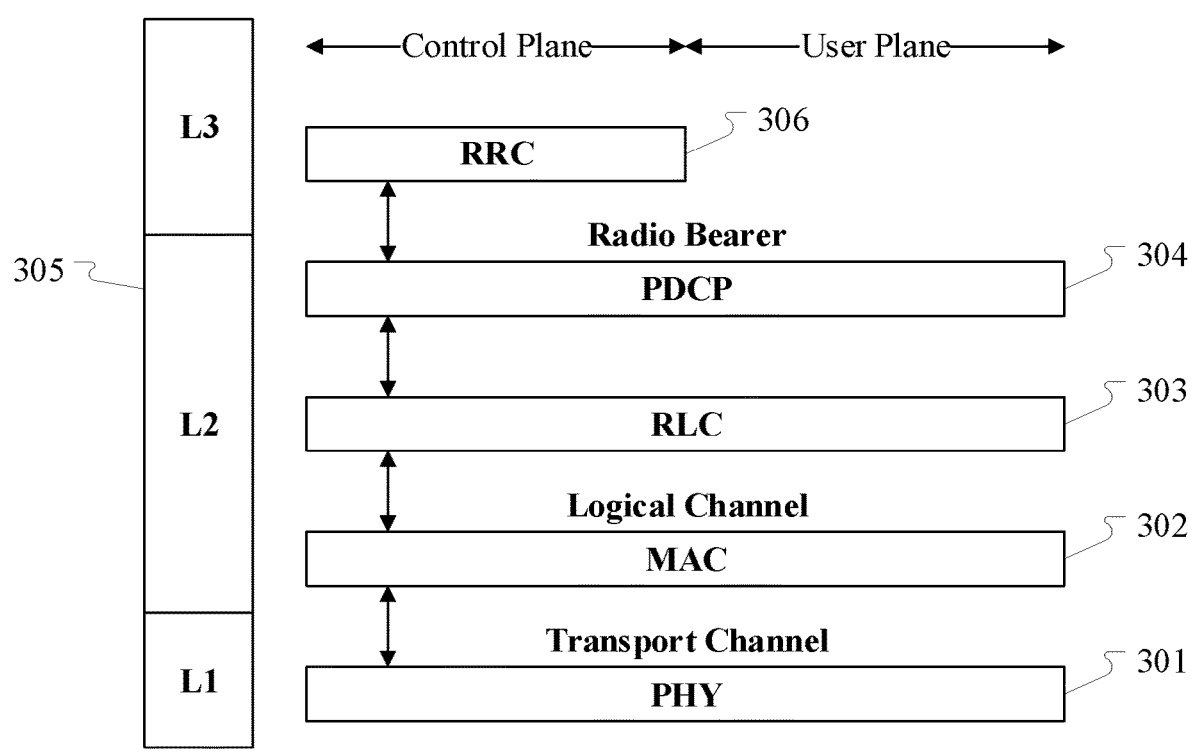
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the DCI of the present disclosure is generated by the PHY 301.

In one embodiment, the first control signaling of the present disclosure is generated by the PHY 301.

In one embodiment, the first feedback information of the present disclosure is generated by the PHY 301.

In one embodiment, the Q control signaling groups of the present disclosure are generated by the PHY 301.

In one embodiment, the first control signaling of the present disclosure is generated by the MAC sublayer 302.

In one embodiment, the first control signaling of the present disclosure is generated by the RRC sublayer 306.

EMBODIMENT 4

Figure 4:
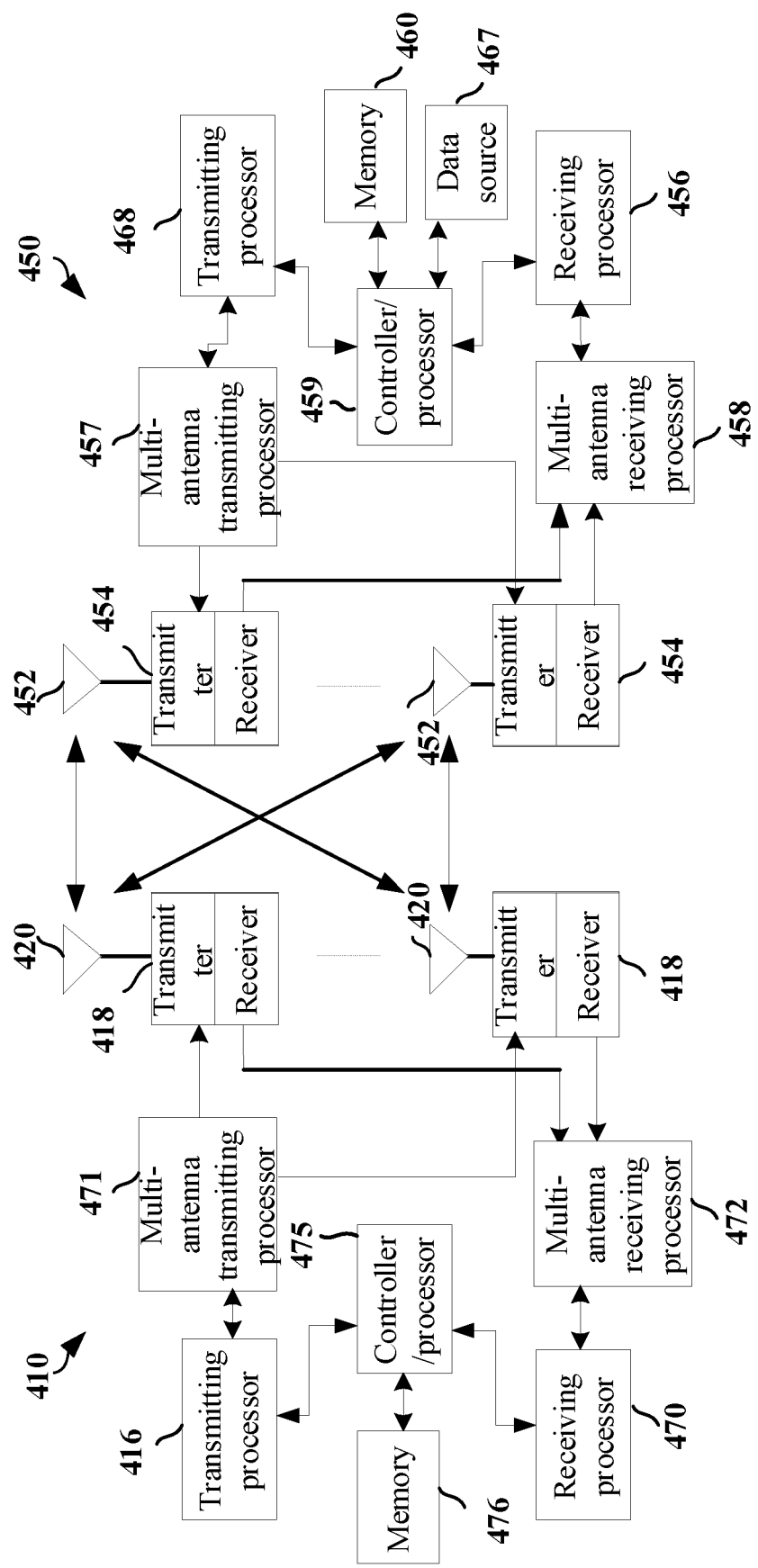
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram of a UE 450 and a gNB 410 in communication with each other in an access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE450. The transmitting processor 416 and the multi-antenna transmitting processor 471 perform signal processing functions used for the L1 layer (that is, PHY). The transmitting processor 416 performs coding and interleaving so as to ensure a Forward Error Correction (FEC) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding and/or beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation, mapping and channel coding. The multi-antenna transmitting processor 457 implements digital multi-antenna spatial precoding and/or beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be associated with the memory 476 that stores program code and data. The memory 476 can be called a computer readable medium. In UL transmission, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the Q control signaling groups of the present disclosure respectively in the Q time windows of the present disclosure, any of the Q control signaling groups comprising a positive integer number of control signaling(s); receives the first control signaling of the present disclosure, the first control signaling indicating Q1 time window(s) out of the Q time windows; and performs energy detection so as to determine whether to perform a transmission on a first time-frequency resource; if yes, a first radio signal is transmitted in the first time-frequency resource, otherwise a transmission of the first radio signal is dropped in the first time-frequency resource.

In one embodiment, the UE 450 comprises a memory that stores a computer readable instruction program. The computer readable instruction program generates an action when executed by at least one processor. The action includes: receiving the Q control signaling groups of the present disclosure respectively in the Q time windows of the present disclosure, any of the Q control signaling groups comprising a positive integer number of control signaling(s); receiving the first control signaling of the present disclosure, the first control signaling indicating Q1 time window(s) out of the Q time windows; and performing energy detection so as to determine whether to perform a transmission on a first time-frequency resource; if yes, a first radio signal is transmitted in the first time-frequency resource, otherwise a transmission of the first radio signal is dropped in the first time-frequency resource.

In one embodiment, the UE 450 comprises at least one processor and at least one memory. The at least one memory includes computer program codes. The at least one memory and the computer program codes are configured to be used in collaboration with the at least one processor. The UE 450 at least receives the Q radio signal groups of the present disclosure respectively in the Q time windows of the present disclosure.

In one embodiment, the UE 450 comprises a memory that stores a computer readable instruction program. The computer readable instruction program generates an action when executed by at least one processor. The action includes: receiving the Q radio signal groups of the present disclosure respectively in the Q time windows of the present disclosure.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the Q control signaling groups of the present disclosure respectively in the Q time windows of the present disclosure; transmits the first control signaling of the present disclosure; and monitors the first radio signal of the present disclosure on the first time-frequency resource of the present disclosure.

In one embodiment, the gNB 410 comprises a memory that stores a computer readable instruction program. The computer readable instruction program generates an action when executed by at least one processor. The action includes: transmitting the Q control signaling groups of the present disclosure respectively in the Q time windows of the present disclosure; transmitting the first control signaling of the present disclosure; and monitoring the first radio signal of the present disclosure on the first time-frequency resource of the present disclosure.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the Q radio signal groups of the present disclosure respectively in the Q time windows of the present disclosure.

In one embodiment, the gNB 410 comprises a memory that stores a computer readable instruction program. The computer readable instruction program generates an action when executed by at least one processor. The action includes: transmitting the Q radio signal groups of the present disclosure respectively in the Q time windows of the present disclosure.

In one embodiment, the UE 450 corresponds to the UE in the present disclosure.

In one embodiment, the gNB 410 corresponds to the base station in the present disclosure.

In one embodiment, at least one of the antenna 452, the receiver 454, the receiving processor 456, the multi-antenna receiving processor 458 or the controller/processor 459 is used for receiving the Q control signaling groups of the present disclosure and the first control signaling of the present disclosure; at least one of the antenna 420, the transmitter 418, the transmitting processor 416, the multi-antenna transmitting processor 471 or the controller/processor 475 is used for transmitting the Q control signaling groups of the present disclosure and the first control signaling of the present disclosure.

In one embodiment, at least one of the antenna 420, the receiver 418, the receiving processor 470, the multi-antenna receiving processor 472 or the controller/processor 475 is used for receiving the first radio signal of the present disclosure; at least one of the antenna 452, the transmitter 454, the transmitting processor 468, the multi-antenna transmitting processor 457 or the controller/processor 459 is used for transmitting the first radio signal of the present disclosure.

In one embodiment, at least one of the antenna 420, the receiver 418, the receiving processor 470, the multi-antenna receiving processor 472 or the controller/processor 475 is used for receiving the Q radio signal groups of the present disclosure; at least one of the antenna 452, the transmitter 454, the transmitting processor 468, the multi-antenna transmitting processor 457 or the controller/processor 459 is used for transmitting the Q radio signal groups of the present disclosure.

In one embodiment, at least one of the antenna 452, the receiver 454, the receiving processor 456, the multi-antenna receiving processor 458 or the controller/processor 459 is used for performing the energy detection of the present disclosure.

EMBODIMENT 5

Figure 5:
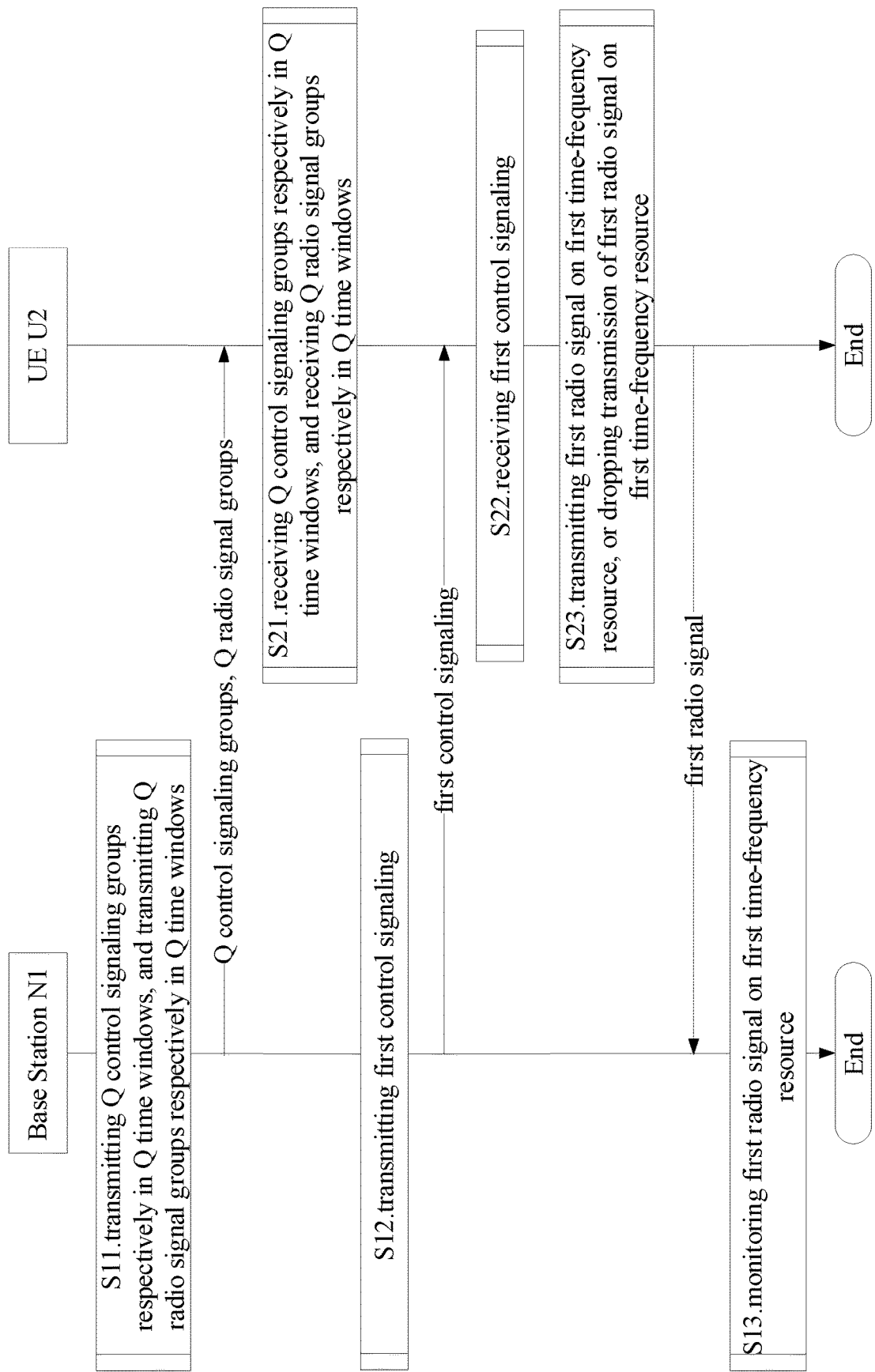
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2.

The N1 transmits Q control signaling groups respectively in Q time windows and transmits Q radio signal groups respectively in Q time windows in step S11; transmits a first control signaling in step S12; and monitors a first radio signal in step S13.

The U2 receives Q control signaling groups respectively in Q time windows and receives Q radio signal groups respectively in Q time windows in step S21; receives a first control signaling in step S22; and performs energy detection in step S23 to determine whether to perform a transmission on a first time-frequency resource; if the result of the energy detection is yes, a first radio signal is transmitted in the first time-frequency resource, or if the result is no, a transmission of the first radio signal is dropped in the first time-frequency resource.

In Embodiment 5, any of the Q control signaling groups comprises a positive integer number of control signaling(s); and the first control signaling indicates Q1 time window(s) out of the Q time windows; any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q; the Q radio signal groups respectively comprise Q bit block groups, of which any bit block group comprises a positive integer number of bit block(s), any radio signal group of the Q radio signal groups comprises a positive integer number of radio signal(s), wherein the positive integer number of radio signal(s) respectively corresponds(correspond) to bit block(s) comprised in a corresponding bit block group; the bit blocks transmitted in the Q1 time window(s) comprise Q1 bit block group(s) of the Q bit block groups, the Q1 bit block groups(s) is(are) respectively transmitted in the Q1 time window(s).

In one embodiment, any bit block comprised in the Q bit block groups belongs to a TB.

In one embodiment, any bit block comprised in the Q bit block groups belongs to a CBG.

In one embodiment, any bit block comprised in the Q bit block groups comprises one and only CBG.

In one embodiment, any bit block comprised in the Q bit block groups only comprises all or part of bits in a TB.

In one embodiment, any radio signal in the Q radio signal groups is an output from a corresponding bit block sequentially going through channel coding, scrambling, Modulation Mapper, a Layer Mapper, precoding, a Resource Element Mapper and broadband symbol generation.

In one embodiment, any radio signal in the Q radio signal groups is an output from a corresponding bit block sequentially going through channel coding, scrambling, Modulation Mapper, a Layer Mapper, a transform precoder, precoding, a Resource Element Mapper and broadband symbol generation.

In one embodiment, control signalings comprised in the Q control signaling groups are all cell-common.

In one embodiment, control signalings comprised in the Q control signaling groups are all identified by CC-RNTI.

In one embodiment, the Q control signaling groups respectively correspond to the Q radio signal groups, all control signalings in any control signaling group of the Q control signaling groups respectively correspond to all radio signals comprised in a corresponding radio signal group.

In one embodiment, any control signaling comprised in the Q control signaling groups comprises configuration information of a corresponding radio signal, and the configuration information comprises at least one of an MCS, an RV or an NDI.

In one embodiment, any control signaling comprised in the Q control signaling groups is UL Grant DCI of a corresponding radio signal.

In one embodiment, any control signaling comprised in the Q control signaling groups and a corresponding radio signal are transmitted in a same slot of a same carrier, the slot comprising a positive integer number of multicarrier symbol(s).

In one embodiment, the slot comprises 14 consecutive multicarrier symbols.

In one embodiment, the slot corresponds to time-domain resources occupied by a Physical Resource Block (PRB).

EMBODIMENT 6

Figure 6:
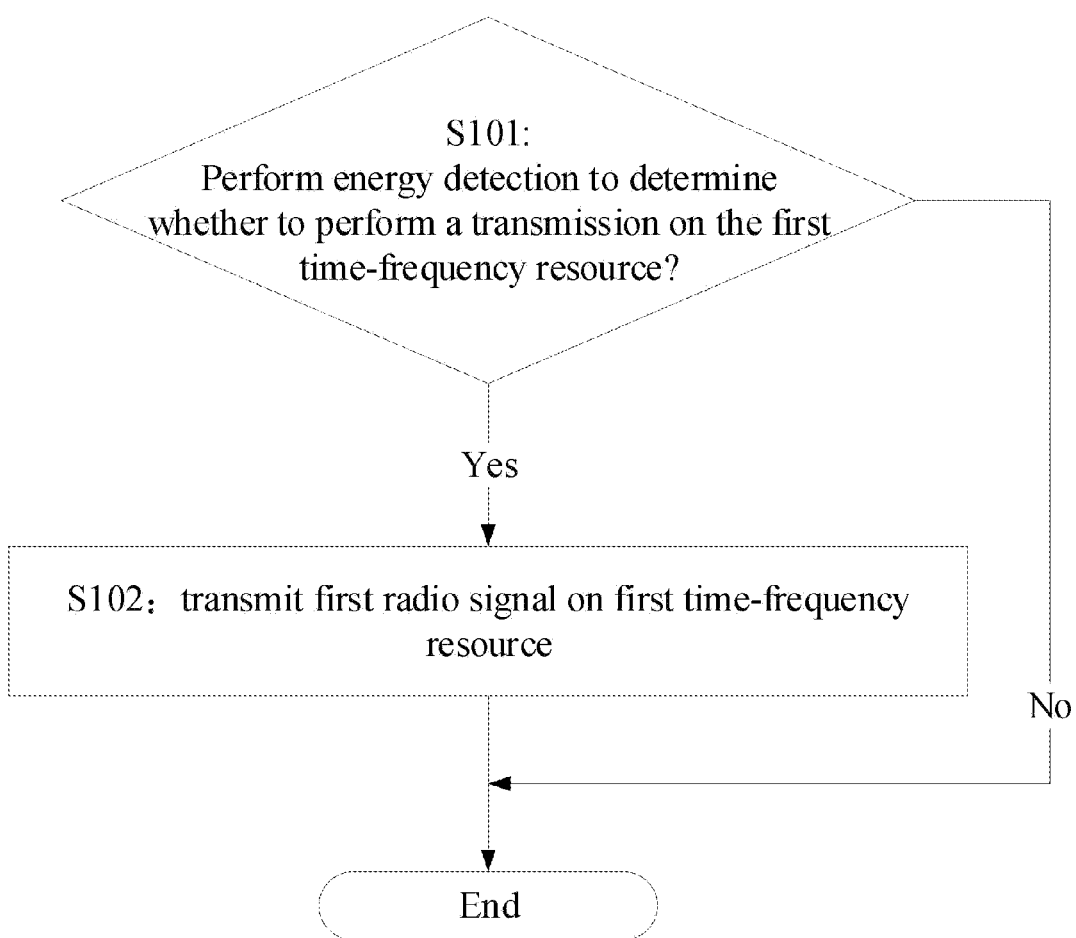
FIG. 6 illustrates a flowchart of determining whether to transmit a first radio signal on a first time-frequency resource according to one embodiment of the present disclosure.

Embodiment 6 illustrates a flowchart of determining whether to transmit a first radio signal on a first time-frequency resource, as shown in FIG. 6.

In Embodiment 6, the UE performs energy detection in step S101 to determine whether to perform a transmission on a first time-frequency resource; if yes, the UE transmits a first radio signal on the first time-frequency resource in step S102, otherwise the UE skips to an end, namely, dropping transmitting the first radio signal on the first time-frequency resource.

In one embodiment, the energy detection comprises T measurements, which are respectively used for determining whether T given time-frequency resources are occupied; if a number of unoccupied given time-frequency resources among the T given time-frequency resources is greater than T1, the UE determines to transmit on the first time-frequency resource, otherwise the UE determines not to transmit on the first time-frequency resource; the T is a positive integer, and the T1 is a positive integer no greater than the T.

In one embodiment, any two given time-frequency resources of the T given time-frequency resources are orthogonal (that is, non-overlapping) in time domain, and each of the T given time-frequency resources is previous to the first time-frequency resource.

In one embodiment, the T is configured by the base station.

In one embodiment, the energy detection corresponds to Cat 4 LBT.

In one embodiment, the energy detection corresponds to Cat 2 LBT.

EMBODIMENT 7

Figure 7:
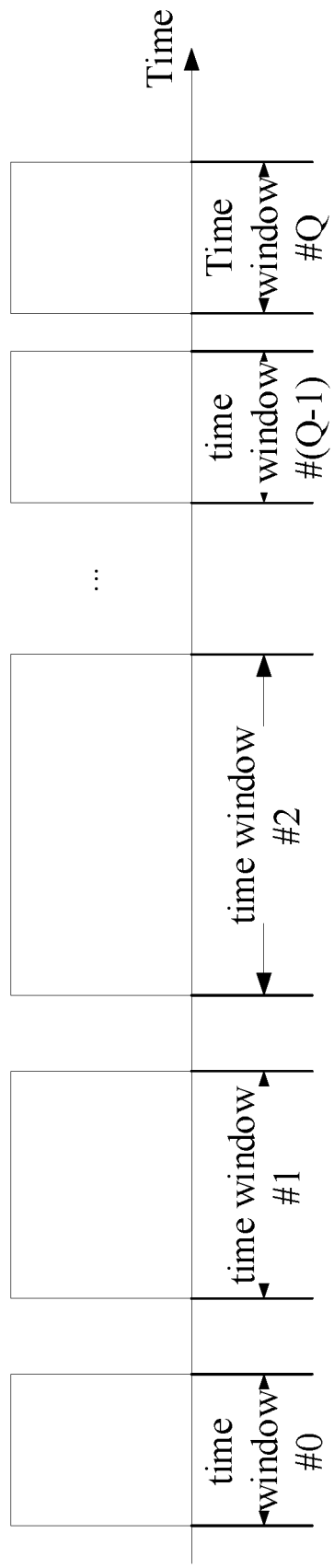
FIG. 7 illustrates a schematic diagram of multiple time windows according to one embodiment of the present disclosure.

Embodiment 7 illustrates a schematic diagram of multiple time windows, as shown in FIG. 7.

In Embodiment 7, time window #0, time window #1, time window #2, and time window #(Q−1) are respectively the Q time windows of the present disclosure, of which any time window comprises a positive integer number of time window(s).

In one embodiment, the first control signaling of the present disclosure is transmitted in a first time window, the first time window is time window #Q in FIG. 7. The first control signaling is used for determining at least the first time-frequency resource between the first time-frequency resource and configuration information of the first radio signal, the configuration information comprises at least one of an MCS, an RV, an NDI or a reception parameter set.

In one embodiment, the first control signaling of the present disclosure is transmitted in a first time window, the first time window is time window #(Q−1) in FIG. 7. The first control signaling is used for determining at least the first time-frequency resource between the first time-frequency resource and configuration information of the first radio signal, the configuration information comprises at least one of an MCS, an RV, an NDI or a reception parameter set.

In one embodiment, the first control signaling indicates Q1. The Q1 time window(s) of the present disclosure is(are) respectively Q1 latest time window(s) among the Q time windows, which is(are) time window #(Q−Q1), time window #(Q−Q1+1), time window #(Q−Q1+2), and time window #(Q−1).

In one embodiment, the Q time windows respectively correspond to Q downlink bursts.

In one embodiment, at least two multicarrier symbols in the Q time windows correspond to different subcarrier spacings.

In one embodiment, at least one time window of the Q time windows comprises multicarrier symbols of various subcarrier spacings.

In one embodiment, on any carrier occupied by the Q radio signal groups of the present disclosure, there is no multicarrier symbol being occupied by a transmitter of the Q radio signal groups between time window #0 and time window #(Q−1) and outside the Q time windows.

In one embodiment, a transmitter of the Q radio signal groups of the present disclosure occupies all multicarrier symbols in the Q time windows.

In one embodiment, a transmitter of the Q radio signal groups of the present disclosure performs LBTs respectively before the Q time windows to determine to transmit in the Q time windows.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, the first control signaling of the present disclosure is transmitted in a first time window, the first control signaling comprises a second field, and the second field in the first control signaling is used for determining at least one of the following:

A first parameter: an accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

A second parameter: a total number of {serving cell, PDCCH monitoring occasion}-pair(s) comprising DCI of a target format up to a current PDCCH monitoring occasion in the first time window.

In one embodiment, each of the Q time windows comprises at least one PDCCH Occasion.

In one embodiment, the PDCCH Occasion comprises a positive integer number of multicarrier symbol(s) in time domain and at least one serving cell in frequency domain.

In one embodiment, the second field in the first control signaling indicates at least one of a remainder left from the first parameter divided by W1 or a remainder left from the second parameter divided by W2; the W1 and the W2 are positive integers greater than 1, respectively.

In one embodiment, the W1 and the W2 are equal.

In one embodiment, both the W1 and the W2 are 4.

EMBODIMENT 8

Figure 8:
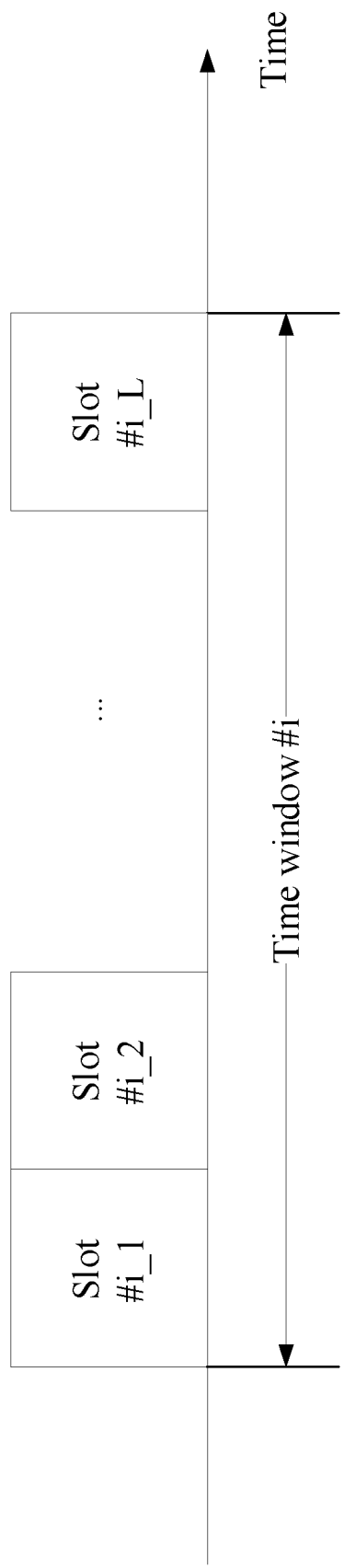
FIG. 8 illustrates a schematic diagram of a time window being composed of multiple slots according to one embodiment of the present disclosure.

Embodiment 8 illustrates a schematic diagram of a time window being composed of multiple slots, as shown in FIG. 8.

In Embodiment 8, time window #i is composed of L slots, L being a positive integer. The L slots respectively correspond to slot #i_1, slot #i_2, . . . and slot #i_L, and any of the L slots comprises a positive integer number of multicarrier symbol(s).

In one embodiment, all of the L slots comprise equal numbers of multicarrier symbols.

In one embodiment, the number of multicarrier symbols comprised in each of the L slots is 14.

In one embodiment, all slots of the L slots other than slot #i_1 and slot #i_L at opposite ends comprise equal numbers of multicarrier symbols.

In one embodiment, the number of multicarrier symbols comprised in each of the L slots other than slot #i_1 and slot #i_L at opposite ends is 14.

In one embodiment, the time window #i is any time window among the Q time windows of the present disclosure.

In one embodiment, the control signaling group of the present disclosure that corresponds to the time window #i comprises L2 control signaling(s), and the L2 control signaling(s) is(are) respectively transmitted in L2 slot(s) of the L slots, the L2 being a positive integer no greater than the L.

In one embodiment, the L2 is equal to the L.

In one embodiment, the L2 is equal to the L, the L2 control signalings respectively indicate the numbers of multicarrier symbols respectively occupied in the L slots.

In one subembodiment, the L2 control signalings are all cell-common.

In one subembodiment, the L2 control signalings are all identified by CC-RNTI.

In one embodiment, the radio signal group of the present disclosure that corresponds to the time window #i comprises L3 radio signal(s), and the L3 radio signal(s) is(are) respectively transmitted in L3 slot(s) of the L slots, the L3 being a positive integer no greater than the L.

In one embodiment, the L2 is equal to the L3, and the L2 control signaling(s) is(are) respectively scheduling signaling(s) of the L3 radio signal(s).

In one subembodiment, each of the L2 control signaling(s) is UE-specific.

In one subembodiment, each of the L2 control signaling(s) is identified by Cell-RNTI (C-RNTI).

In one embodiment, each of the L slots comprises at least one PDCCH Occasion of the present disclosure.

In one embodiment, a slot comprises a positive integer number of multicarrier symbol(s).

In one embodiment, the PDCCH Occasion of the present disclosure is a part of a Control Resource Set (CoReset) that lies in a slot.

In one embodiment, the multicarrier symbol is an OFDM symbol.

In one embodiment, the multicarrier symbol is an SC-FDMA symbol.

In one embodiment, the multicarrier symbol is a DFT-S-OFDM symbol.

In one embodiment, the multicarrier symbol is an FBMC symbol.

In one embodiment, the multicarrier symbol comprises a CP.

EMBODIMENT 9

Figure 9:
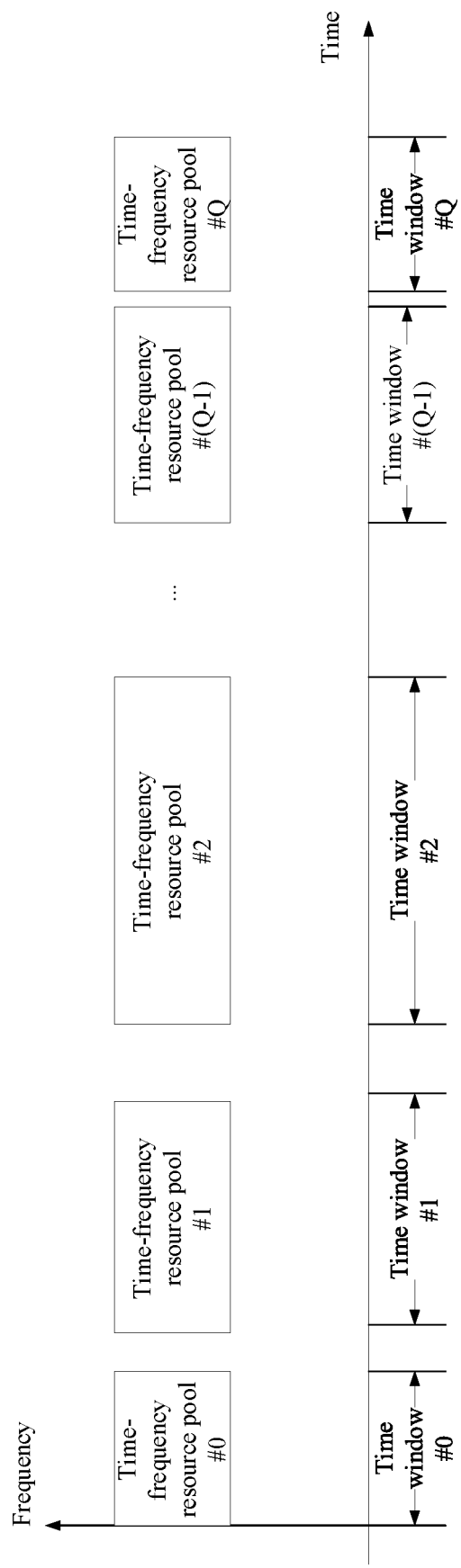
FIG. 9 illustrates a schematic diagram of a plurality of time-frequency resource pools belonging to a same sub-band according to one embodiment of the present disclosure.

Embodiment 9 illustrates a schematic diagram of a plurality of time-frequency resource pools belonging to a same sub-band, as shown in FIG. 9.

In Embodiment 9, time-frequency resource pools #0, #1 ..., and #(Q-1) respectively belong to time windows #0, #1 ..., and #(Q-1), and the time-frequency resource pools #0, #1 ..., and #(Q-1) all belong to a first sub-band.

In Embodiment 9, the Q control signaling groups of the present disclosure are respectively transmitted in the time-frequency resource pools #0, #1 ..., and #(Q-1), and the Q radio signal groups of the present disclosure are also respectively transmitted in the time-frequency resource pools #0, #1 ..., and #(Q-1).

In one embodiment, the first sub-band is deployed at Unlicensed Spectrum.

In one embodiment, the first sub-band is a carrier.

In one embodiment, the first sub-band is a Bandwidth Part (BWP).

In one embodiment, the first sub-band is frequency-domain resources occupied by a serving cell.

In one embodiment, the first time-frequency resource of the present disclosure is located within time-frequency pool #Q in FIG. 9.

In one embodiment, the first control signaling of the present disclosure is transmitted in time-frequency pool #Q in FIG. 9.

In one embodiment, the UE of the present disclosure performs LBT respectively in the time-frequency resource pools #0, #1 ..., and #(Q-1) to determine that an uplink HARQ-ACK cannot be transmitted in time-frequency resource sub-pools #0, #1 ..., and #(Q-1), and the time-frequency resource sub-pools #0, #1 ..., and #(Q-1) respectively belong to the time-frequency resource pools #0, #1 ..., and #(Q-1).

EMBODIMENT 10

Figure 10:
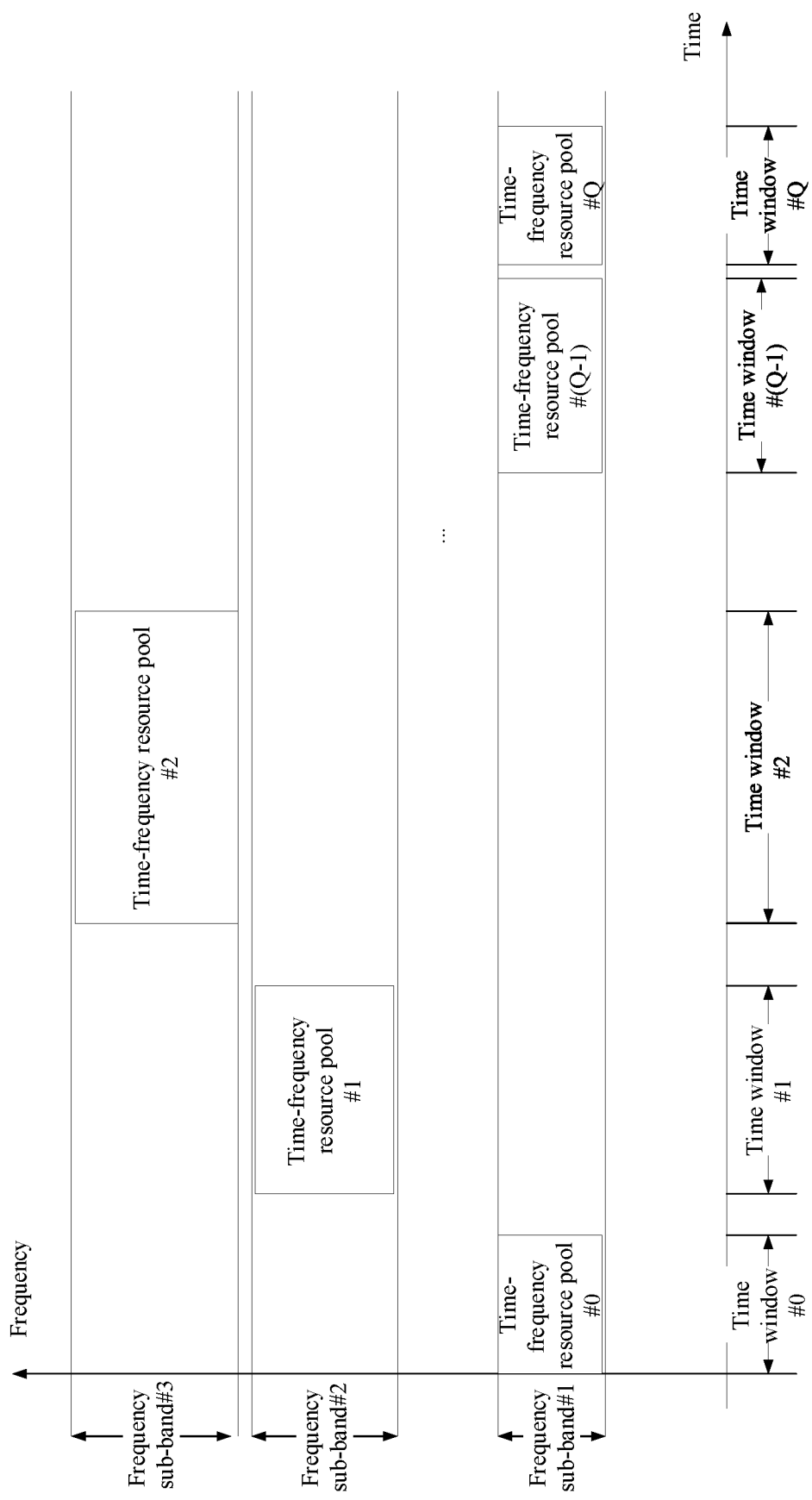
FIG. 10 illustrates a schematic diagram of a plurality of time-frequency resource pools belonging to different sub-bands according to one embodiment of the present disclosure.

Embodiment 10 illustrates a schematic diagram of a plurality of time-frequency resource pools belonging to different sub-bands, as shown in FIG. 10.

In Embodiment 10, time-frequency resource pools #0, #1 ..., and #(Q-1) respectively belong to time windows #0, #1 ..., and #(Q-1) in time domain; the time-frequency resource pools #0, #1 ..., and #(Q-1) occupy a plurality sub-bands in frequency domain, where the plurality of sub-bands at least comprise sub-bands #0, #1, and #2.

In Embodiment 10, the Q control signaling groups of the present disclosure are transmitted respectively in the time-frequency resource pools #0, #1 ..., and #(Q-1), and the Q radio signal groups of the present disclosure are also transmitted respectively in the time-frequency resource pools #0, #1 ..., and #(Q-1).

In one embodiment, sub-band #0, sub-band #1 and sub-band #2 are deployed at Unlicensed Spectrum.

In one embodiment, the sub-bands #0, #1, and #2 each are carriers respectively.

In one embodiment, the sub-bands #0, #1, and #2 each are BWPs respectively.

EMBODIMENT 11

Figure 11:
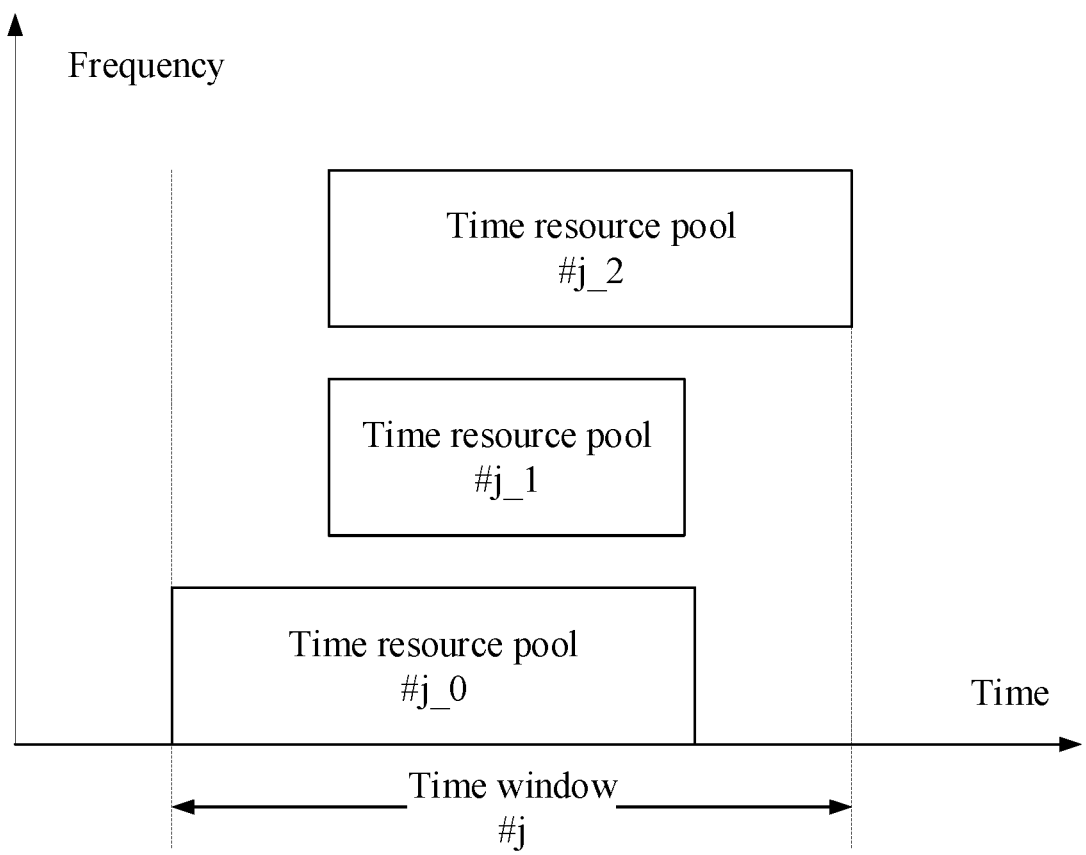
FIG. 11 illustrates a schematic diagram of a plurality of time-frequency resource pools in a same time window according to one embodiment of the present disclosure.

Embodiment 11 illustrates a schematic diagram of a plurality of time-frequency resource pools in a same time window, as shown in FIG. 11.

In Embodiment 11, time window #j is a given time window of the Q time windows. A radio signal group among the Q radio signal groups of the present disclosure that corresponds to the time window #j comprises three radio signal sub-groups, which are a first radio signal sub-group, a second radio signal sub-group and a third radio signal sub-group. The three radio signal sub-groups respectively comprise a positive integer number of radio signal(s). The first radio signal sub-group, the second radio signal sub-group and the third radio signal sub-group are transmitted respectively in time-frequency resource pools #j_0, #j_1 and j_2 in FIG. 11; and the time-frequency resource pools #j_0, #j_1 and #j_2 respectively belong to three sub-bands in frequency domain.

In one embodiment, the three sub-bands are deployed at Unlicensed Spectrum.

In one embodiment, a control signaling group among the Q control signaling groups of the present disclosure that corresponds to the time window #j comprises three control signaling sub-groups, which are a first control signaling sub-group, a second control signaling sub-group and a third control signaling sub-group; each of the three control signaling sub-groups respectively comprises a positive integer number of control signaling(s). The first control signaling sub-group, the second control signaling sub-group and the third control signaling sub-group are transmitted respectively in time-frequency resource pools #j_0, #j_1 and #j_2 in FIG. 11; and the time-frequency resource pools #j_0, #j_1 and #j_2 respectively belong to three sub-bands in frequency domain.

In one embodiment, the three sub-bands respectively correspond to three serving cells.

In one embodiment, the first control signaling of the present disclosure is transmitted in a first time window, the first control signaling comprises a second field, and the second field in the first control signaling is used for determining at least one of the following:

A first parameter: an accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

A second parameter: a total number of {serving cell, PDCCH monitoring occasion}-pair(s) comprising DCI of a target format up to a current PDCCH monitoring occasion in the first time window.

In one embodiment, the PDCCH Occasion comprises a positive integer number of multicarrier symbol(s) in time domain and comprises at least one serving cell in frequency domain.

In one embodiment, the PDCCH Occasion in the time window #j comprises a positive integer number of multicarrier symbol(s) in time domain and comprises three serving cells in frequency domain.

In one embodiment, the second field in the first control signaling indicates at least one of a remainder left from the first parameter divided by W1 or a remainder left from the second parameter divided by W2; the W1 and the W2 are positive integers greater than 1, respectively.

In one embodiment, the W1 and the W2 are equal.

In one embodiment, both the W1 and the W2 are 4.

EMBODIMENT 12

Figure 12:
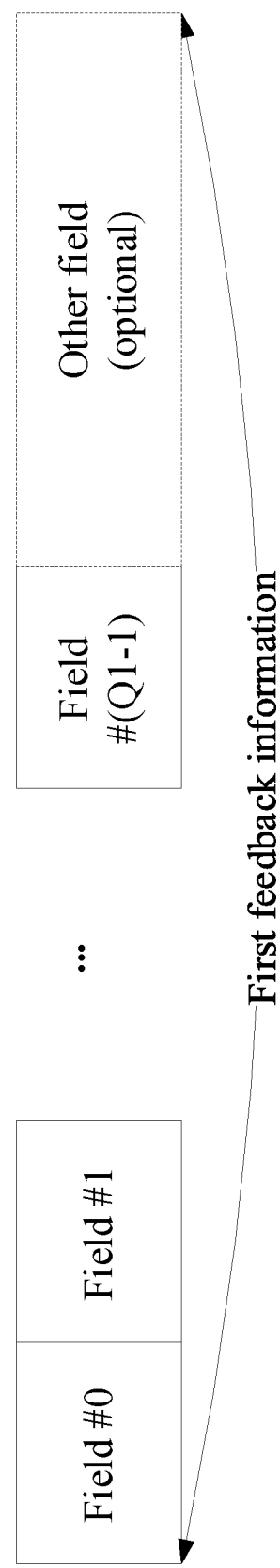
FIG. 12 illustrates a schematic diagram of first feedback information according to one embodiment of the present disclosure.

Embodiment 12 illustrates a schematic diagram of first feedback information, as shown in FIG. 12.

In Embodiment 12, the first feedback information comprises Q1 fields, which are field #0, field #1, field #2 . . . , and field #(Q1−1) in FIG. 12. The Q1 fields respectively correspond to the Q1 time windows of the present disclosure, and each of the Q1 fields is used for determining whether bit blocks transmitted in a corresponding time window is correctly decoded.

In one embodiment, each of the Q fields comprises an equal number of bits.

In one embodiment, the first control signaling indicates the number of bits in each of the Q1 fields.

In one embodiment, at least two of the Q1 fields comprise different numbers of bits.

In one embodiment, a given field of the Q1 fields is composed of two bits, if a number of bit blocks transmitted in a corresponding time window is no greater than 2, then the bit blocks transmitted in the corresponding time window are respectively indicated by one bit comprised in the given field whether each bit block is correctly decoded; otherwise at least two of the bit blocks transmitted in the corresponding time window are indicated by one bit comprised in the given field through bundling whether each bit block is correctly decoded.

EMBODIMENT 13

Figure 13:
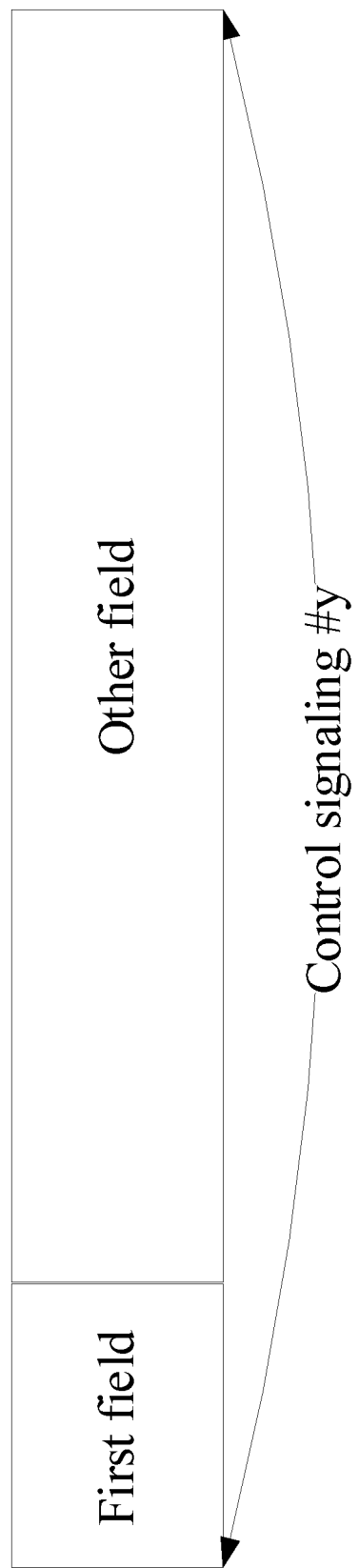
FIG. 13 illustrates a schematic diagram of a given control signaling according to one embodiment of the present disclosure.

Embodiment 13 illustrates a schematic diagram of a given control signaling, as shown in FIG. 13.

In Embodiment 13, the given control signaling comprises a first field, and a value of the first field in the given control signaling is equal to a remainder of an index of a time window corresponding to the given control signaling when divided by Q2, wherein the Q2 is a positive integer greater than 1.

In one embodiment, the Q2 is 4.

In one embodiment, the given control signaling is any one control signaling in the Q control signaling groups of the present disclosure; all control signalings comprised in any control signaling group of the Q control signaling groups comprise first fields of a same value, which is equal to a remainder of an index of a time window corresponding to the any control signaling group when divided by the Q2.

In one embodiment, indexes for the Q time windows are 0, 1, 2 . . . , and Q−1, respectively.

In one embodiment, the given control signaling is the first control signaling of the present disclosure.

In one embodiment, the other field in FIG. 13 indicates multicarrier symbols occupied in a corresponding slot.

In one embodiment, the other field in FIG. 13 indicates configuration information of a corresponding radio signal.

EMBODIMENT 14

Figure 14:
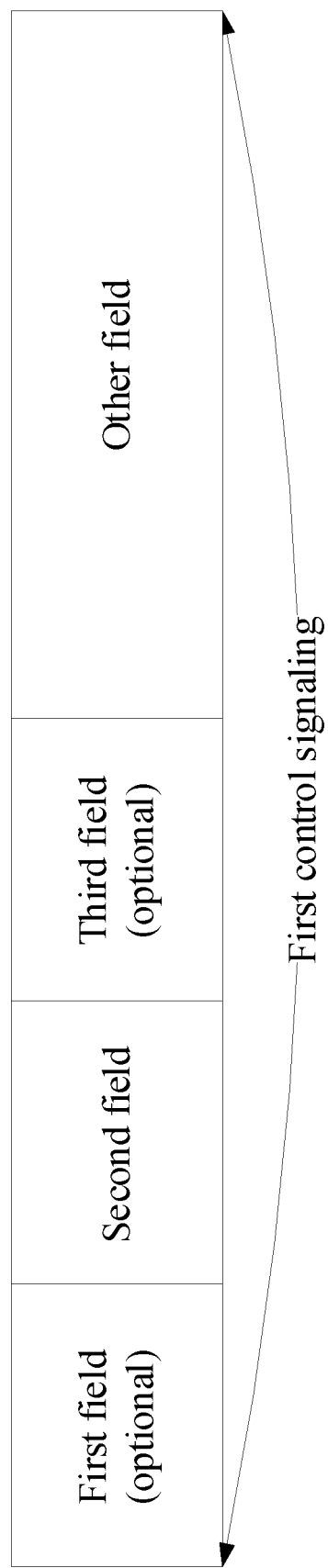
FIG. 14 illustrates a schematic diagram of a first control signaling according to one embodiment of the present disclosure.

Embodiment 14 illustrates a schematic diagram of a first control signaling, as shown in FIG. 14.

In Embodiment 14, the first control signaling comprises at least the second field and the other field among a first field, a second field, a third field and the other field.

The other field in the first control signaling indicates the first time-frequency resource of the present disclosure.

The first control signaling is transmitted in a first time window, and the second field in the first control signaling is used for determining at least one of the following:

A first parameter, which is determined through the method below: initializing the first counter as 0; first sequencing each PDCCH Occasion in a first PDCCH Occasion set according to temporal order and then traversing all {serving cell, PDCCH Occasion}-pair(s) in a first time window according to an ascending order of indexes of serving cells till the (serving cell, PDCCH Occasion)-pair to which the first control signaling belongs; each time when a serving cell—PDCCH Occasion pair comprises DCI of a target format, the first counter is increased by 1; the first parameter is equal to the value of the first counter after the traversing is completed.

A second parameter, which is determined through the method below: initializing the second counter as 0; first sequencing each PDCCH Occasion in a first PDCCH Occasion set according to temporal order and then traversing all serving cell-PDCCH Occasion pairs in a first time window according to an ascending order of indexes of serving cells till all the serving cells in a PDCCH Occasion to which the first control signaling belongs; each time when a serving cell—PDCCH Occasion pair comprises DCI of a target format, then the second counter is increased by 1; the second parameter is equal to the value of the second counter after traversing is completed.

In one embodiment, the first control signaling comprises a first field, and the first field in the first control signaling is used for indexing the first time window.

In one embodiment, the other field in the first control signaling indicates the configuration information of the first radio signal.

In one embodiment, the first control signaling comprises a third field, and the third field in the first control signaling indicates the Q1 of the present disclosure.

EMBODIMENT 15

Figure 15:
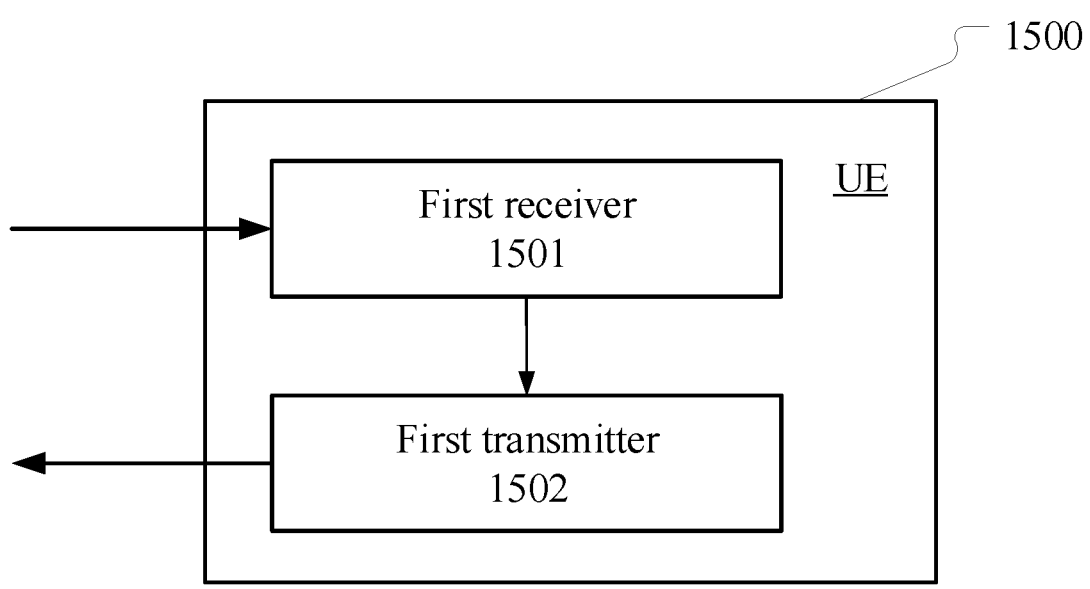
FIG. 15 illustrates a structure block diagram of a processing device in a UE according to one embodiment of the present disclosure.

Embodiment 15 illustrates a structure block diagram of a processing device in a UE, as shown in FIG. 15. In Embodiment 15, a UE 1500 comprises a first receiver 1501 and a first receiver 1502.

The first receiver 1501 receives Q control signaling groups respectively in Q time windows, any of the Q control signaling groups comprising a positive integer number of control signaling(s); and receives a first control signaling, the first control signaling indicating Q1 time window(s) out of the Q time windows.

The first transmitter 1502 performs energy detection so as to determine whether to perform a transmission on a first time-frequency resource; if yes, a first radio signal is transmitted in the first time-frequency resource, otherwise a transmission of the first radio signal is dropped in the first time-frequency resource.

In Embodiment 15, any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

In one embodiment, the first transmitter 1502 receives Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), and the positive integer number of radio signal(s) respectively corresponds(correspond) to bit block(s) comprised in a corresponding bit block group; herein, the bit blocks transmitted in the Q1 time window(s) comprise Q1 bit block group(s) of the Q bit block groups, and the Q1 bit block groups(s) is(are) respectively transmitted in the Q1 time window(s).

In one embodiment, the first receiver 1501 comprises the antenna 452 and the receiver 454 in FIG. 4.

In one embodiment, the first receiver 1501 comprises the multi-antenna receiving processor 458 and the receiving processor 456 in FIG. 4.

In one embodiment, the first receiver 1501 comprises the memory 460 in FIG. 4.

In one embodiment, the first receiver 1501 comprises the controller/processor 459 in FIG. 4.

In one embodiment, the first transmitter 1502 comprises the antenna 452 and the transmitter 454 in FIG. 4.

In one embodiment, the first transmitter 1502 comprises the multi-antenna transmitting processor 457 and the transmitting processor 468 in FIG. 4.

In one embodiment, the first transmitter 1502 comprises the data source 467 in FIG. 4.

In one embodiment, the first transmitter 1502 comprises the controller/processor 459 in FIG. 4.

EMBODIMENT 16

Figure 16:
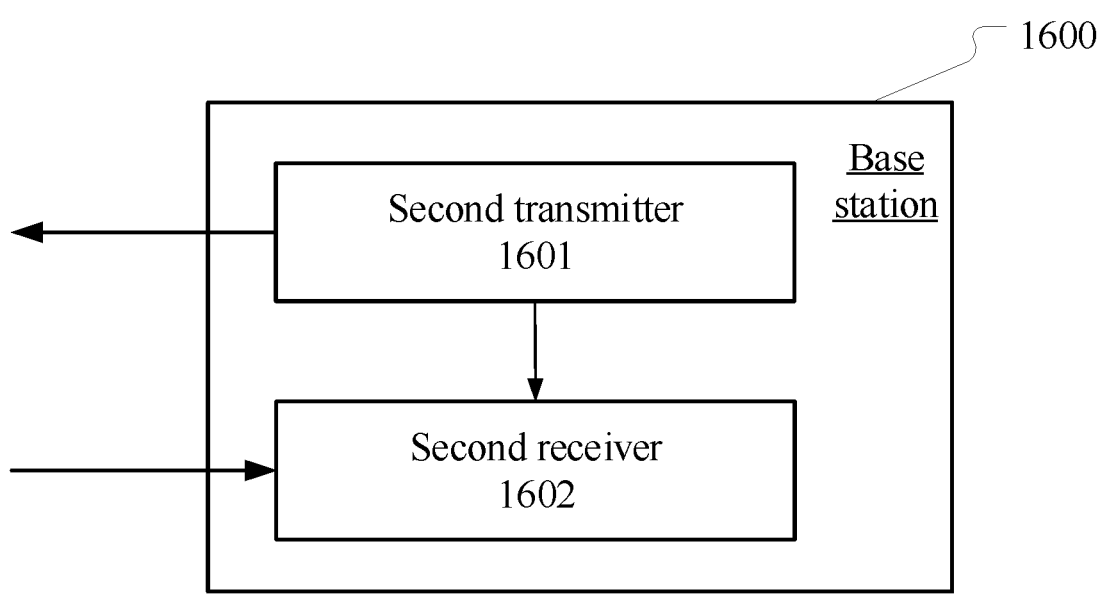
FIG. 16 illustrates a structure block diagram of a processing device in a base station according to one embodiment of the present disclosure.

Embodiment 16 illustrates a structure block diagram of a processing device in a base station, as shown in FIG. 16. In Embodiment 16, a base station 1600 comprises a second transmitter 1601 and a second receiver 1602.

The second transmitter 1601 transmits Q control signaling groups respectively in Q time windows, any of the Q control signaling groups comprising a positive integer number of control signaling(s); and transmits a first control signaling, the first control signaling indicating Q1 time window(s) out of the Q time windows.

The second receiver 1602 monitors a first radio signal on a first time-frequency resource.

In Embodiment 16, any two time windows of the Q time windows are orthogonal in time domain; any control signaling comprised by the Q control signaling groups comprises a first field; for any of the Q control signaling groups, first fields comprised in all the control signalings are of a same value; among any Q2 adjacent control signaling groups of the Q control signaling groups, any two control signaling groups comprise first fields of different values; the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

The second transmitter 1601 transmits Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), and the positive integer number of radio signal(s) respectively corresponds(correspond) to bit block(s) comprised in a corresponding bit block group; herein, the bit blocks transmitted in the Q1 time window(s) comprise Q1 bit block group(s) of the Q bit block groups, and the Q1 bit block groups(s) is(are) respectively transmitted in the Q1 time window(s).

In one embodiment, the second transmitter 1601 comprises the antenna 420 and the transmitter 418 in FIG. 4.

In one embodiment, the second transmitter 1601 comprises the multi-antenna transmitting processor 471 and the transmitting processor 416 in FIG. 4.

In one embodiment, the second transmitter 1601 comprises the controller/processor 475 in FIG. 4.

In one embodiment, the second receiver 1602 comprises the antenna 420 and the receiver 418 in FIG. 4.

In one embodiment, the second receiver 1602 comprises the multi-antenna receiving processor 472 and the receiving processor 470 in FIG. 4.

In one embodiment, the second receiver 1602 comprises the memory 476 in FIG. 4.

In one embodiment, the second receiver 1602 comprises the controller/processor 475 in FIG. 4.

EMBODIMENT 17

Figure 17:
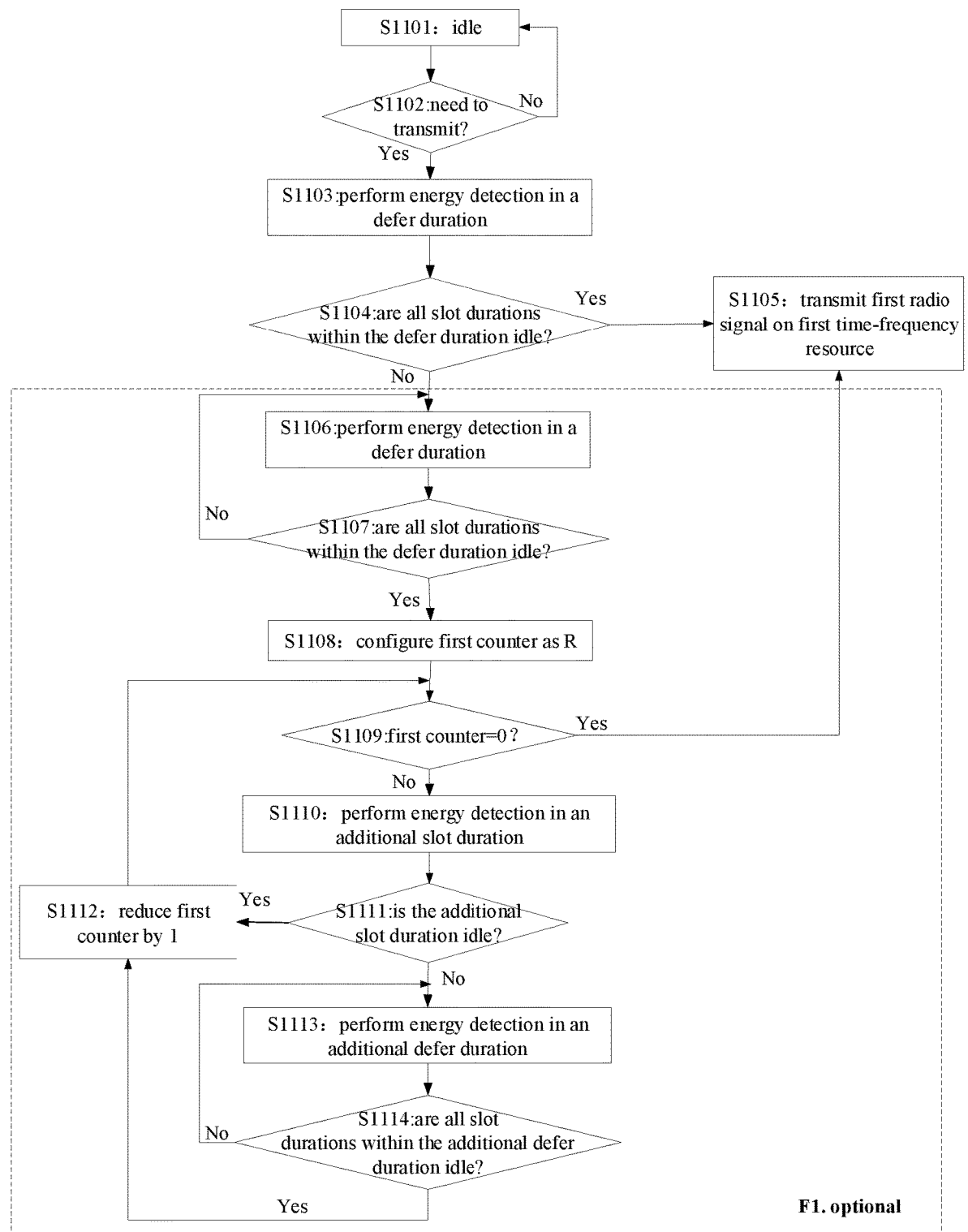
FIG. 17 illustrates a flowchart of determining whether to transmit a first radio signal on a first time-frequency resource according to one embodiment of the present disclosure.

Embodiment 17 illustrates a flowchart of determining whether to transmit a first radio signal on a first time-frequency resource, as shown in FIG. 17. Steps in box F1 are optional.

In Embodiment 17, a UE performs R measurements respectively in R time sub-pools. The energy detection of the present disclosure comprises the R measurements.

The UE performs the R measurements respectively in the R time sub-pools to obtain R measured power values. Each of R1 measured power value(s) of the R measured power values is lower than a specific threshold. R1 time sub-pool(s) is(are) time sub-pool(s) corresponding to the R1 measured power value(s) among the R time sub-pools. The process of the R measurements can be described as the flowchart in FIG. 17.

The UE is idle in step S1101 and determine whether to transmit in step S1102; performs energy detection in a defer duration in step S1103; and determines in step S1104 whether all slot durations within the defer duration are idle, if yes, move forward to step S1105 to transmit a first radio signal; otherwise move forward to step S1106 to perform energy detection in a defer duration; the UE determines in step S1107 whether all slot durations within the defer duration are idle, if yes, move forward to step S1108 to set a first counter as R1; otherwise go back to step S1106; determines whether the first counter is 0 in step S1109, if yes, move back to step S1105 to transmit the first radio signal; otherwise move forward to step S1110 to perform energy detection in an additional slot duration; determines in step S1111 whether the additional slot duration is idle, if yes, move forward to step S1112 to reduce the first counter by 1 and then go back to step S1109; otherwise move forward to step S1113 to perform energy detection in an additional defer duration; and determines in step S1114 whether all slot durations within the additional defer duration are idle, if yes, move back to step S1112; otherwise go back to step S1113.

In one embodiment, the R1 is equal to 0; the UE determines in step S1104 that all slot durations within the defer duration are idle.

In one embodiment, each of the R measured power values and the specific threshold are measured by dBm.

In one embodiment, each of the R measured power values and the specific threshold are measured by mW.

In one embodiment, each of the R measured power values and the specific threshold are measured by J.

In one embodiment, the specific threshold is equal to or less than −72 dBm.

In one embodiment, the R time sub-pools are of a same time duration.

In one embodiment, any time sub-pool of the R time sub-pools lasts no longer than 25 μs.

In one embodiment, any time sub-pool of the R time sub-pools lasts no longer than 34 μs.

In one embodiment, any time sub-pool of the R time sub-pools lasts no longer than 9 μs.

In one embodiment, any time sub-pool of the R time sub-pools lasts no longer than 16 μs.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication device or UE or terminal in the present disclosure includes but is not limited to mobile phones, tablet computers, notebooks, network cards, low-consumption equipment, eMTC equipment, NB-IoT equipment, vehicle-mounted communication equipment, aircrafts, airplanes, unmanned aerial vehicles, and telecontrolled aircrafts, etc. The second-type communication device, or base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a user equipment (UE) for wireless communications, comprising:
   receiving Q control signaling groups respectively in Q time windows, any of the Q control signaling groups comprising a positive integer number of control signaling(s);
   receiving a first control signaling, the first control signaling indicating Q1 time window(s) out of the Q time windows; and
   performing energy detection so as to determine whether to perform a transmission on a first time-frequency resource; if yes, performing the transmission to transmit a first radio signal on the first time-frequency resource, otherwise not performing the transmission on the first time-frequency resource;
   wherein any two time windows of the Q time windows are orthogonal in time domain;
   any control signaling comprised by the Q control signaling groups comprises a first field;
   among the Q control signaling groups, first fields of same control signaling groups are of a same value;
   among Q2 adjacent control signaling groups of the Q control signaling groups, first fields of different control signaling groups are of different values;
   the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

2. The method according to claim 1, comprising:
receiving Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), wherein the positive integer number of radio signal(s) respectively corresponds(correspond) to bit block(s) comprised in a corresponding bit block group;
wherein the bit blocks transmitted in the Q1 time window(s) comprise Q1 bit block group(s) of the Q bit block groups, and the Q1 bit block groups(s) is(are) respectively transmitted in the Q1 time window(s).

3. The method according to claim 1, wherein the first control signaling is used for determining at least the first time-frequency resource between the first time-frequency resource and configuration information of the first radio signal, the configuration information comprises at least one of a Modulation and Coding Status, a Redundancy Version (RV), a New Data Indication (NDI) or a reception parameter set.

4. The method according to claim 1, wherein the first feedback information comprises Q1 field(s), each of the Q1 field(s) comprises an equal number of bits, the Q1 field(s) respectively corresponds(correspond) to the Q1 time window(s), and each of the Q1 field(s) is used for determining whether bit block(s) transmitted in a corresponding time window is(are) correctly decoded.

5. The method according to claim 1, wherein the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

6. The method according to claim 1, wherein the first control signaling is transmitted in a first time window, the first control signaling comprises a second field, and the second field in the first control signaling is used for determining at least one of the following:
an accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;
a total number of {serving cell, PDCCH monitoring occasion}-pair(s) comprising DCI of a target format up to a current PDCCH monitoring occasion in the first time window.

7. A method in a base station for wireless communications, comprising:
transmitting Q control signaling groups respectively in Q time windows, any of the Q control signaling groups comprising a positive integer number of control signaling(s);
transmitting a first control signaling, the first control signaling indicating Q1 time window(s) out of the Q time windows; and
monitoring a first radio signal on a first time-frequency resource;
wherein any two time windows of the Q time windows are orthogonal in time domain; any control signaling comprised by the Q control signaling groups comprises a first field;
among the Q control signaling groups, first fields of same control signaling groups are of a same value;
among Q2 adjacent control signaling groups of the Q control signaling groups, first fields of different control signaling groups are of different values;
the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

8. The method according to claim 7, comprising:
transmitting Q radio signal groups respectively in the Q time windows, the Q radio signal groups respectively comprise Q bit block groups, any bit block group of the Q bit block groups comprises a positive integer number of bit block(s), any radio signal group of the Q radio signal groups comprises a positive integer number of radio signal(s), wherein the positive integer number of radio signal(s) respectively corresponds(correspond) to bit block(s) comprised in a corresponding bit block group;
wherein the bit blocks transmitted in the Q1 time window(s) comprise Q1 bit block group(s) of the Q bit block groups, and the Q1 bit block groups(s) is(are) respectively transmitted in the Q1 time window(s).

9. The method according to claim 7, wherein the first control signaling is used for determining at least the first time-frequency resource between the first time-frequency resource and configuration information of the first radio signal, the configuration information comprises at least one of a Modulation and Coding Status, a Redundancy Version (RV), a New Data Indication (NDI) or a reception parameter set.

10. The method according to claim 7, wherein the first feedback information comprises Q1 field(s), each of the Q1 field(s) comprises an equal number of bits, the Q1 field(s) respectively corresponds(correspond) to the Q1 time window(s), and each of the Q1 field(s) is used for determining whether bit block(s) transmitted in a corresponding time window is(are) correctly decoded.

11. The method according to claim 7, wherein the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

12. The method according to claim 7, wherein the first control signaling is transmitted in a first time window, the first control signaling comprises a second field, and the second field in the first control signaling is used for determining at least one of the following:
an accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

a total number of {serving cell, PDCCH monitoring occasion}-pair(s) comprising DCI of a target format up to a current PDCCH monitoring occasion in the first time window.

13. A UE for wireless communications, comprising:
a first receiver: receiving Q control signaling groups respectively in Q time windows, any of the Q control signaling groups comprising a positive integer number of control signaling(s); and receiving a first control signaling, the first control signaling indicating Q1 time window(s) out of the Q time windows;
a first transmitter: performing energy detection so as to determine whether to perform a transmission on a first time-frequency resource; if yes, the first transmitter performs the transmission to transmit a first radio signal on the first time-frequency resource, otherwise the first transmitter does not perform the transmission on the first time-frequency resource;
wherein any two time windows of the Q time windows are orthogonal in time domain; any control signaling comprised by the Q control signaling groups comprises a first field;
among the Q control signaling groups, first fields of same control signaling groups are of a same value;
among Q2 adjacent control signaling groups of the Q control signaling groups, first fields of different control signaling groups are of different values;
the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

14. The UE according to claim 13, comprising:
a first receiver: receiving Q radio signal groups respectively in the Q time windows, the Q radio signal groups respectively comprise Q bit block groups, of which any bit block group comprises a positive integer number of bit block(s), any radio signal group of the Q radio signal groups comprises a positive integer number of radio signal(s), wherein the positive integer number of radio signal(s) respectively corresponds(correspond) to bit block(s) comprised in a corresponding bit block group;
wherein the bit blocks transmitted in the Q1 time window(s) comprise Q1 bit block group(s) of the Q bit block groups, and the Q1 bit block group(s) is(are) respectively transmitted in the Q1 time window(s).

15. The UE according to claim 13, wherein the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

16. The UE according to claim 13, wherein the first control signaling is transmitted in a first time window, the first control signaling comprises a second field, and the second field in the first control signaling is used for determining at least one of the following:
an accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;
a total number of {serving cell, PDCCH monitoring occasion}-pair(s) comprising DCI of a target format up to a current PDCCH monitoring occasion in the first time window.

17. A base station for wireless communications, comprising:
a second transmitter: transmitting Q control signaling groups respectively in Q time windows, any of the Q control signaling groups comprising a positive integer number of control signaling(s); and transmitting a first control signaling, the first control signaling indicating Q1 time window(s) out of the Q time windows;
a second receiver: monitoring a first radio signal on a first time-frequency resource;
wherein any two time windows of the Q time windows are orthogonal in time domain; any control signaling comprised by the Q control signaling groups comprises a first field;
among the Q control signaling groups, first fields of same control signaling groups are of a same value;
among Q2 adjacent control signaling groups of the Q control signaling groups, first fields of different control signaling groups are of different values;
the first radio signal comprises first feedback information, the first feedback information is used for determining whether bit blocks transmitted in the Q1 time window(s) are correctly decoded, the Q is a positive integer greater than 1, and the Q1 and the Q2 are respectively positive integers no greater than the Q.

18. The base station according to claim 17, comprising:
a second transmitter: transmitting Q radio signal groups respectively in the Q time windows, the Q radio signal groups respectively comprise Q bit block groups, any bit block group of the Q bit block groups comprises a positive integer number of bit block(s), any radio signal group of the Q radio signal groups comprises a positive integer number of radio signal(s), wherein the positive integer number of radio signal(s) respectively corresponds(correspond) to bit block(s) comprised in a corresponding bit block group;
wherein the bit blocks transmitted in the Q1 time window(s) comprise Q1 bit block group(s) of the Q bit block groups, and the Q1 bit block groups(s) is(are) respectively transmitted in the Q1 time window(s).

19. The base station according to claim 17, wherein the first feedback information comprises Q1 field(s), the Q1 field(s) respectively corresponds(correspond) to the Q1 time window(s), and each of the Q1 field(s) is used for determining whether bit block(s) transmitted in a corresponding time window is(are) correctly decoded, the first control signaling is used for determining the number of bit block(s) comprised in each of the Q1 field(s).

20. The base station according to claim 17, wherein the first control signaling is transmitted in a first time window, the first control signaling comprises a second field, and the second field in the first control signaling is used for determining at least one of the following:
an accumulative number of {serving cell, PDCCH monitoring occasion}-pair(s) comprising downlink control information (DCI) of a target format up to a current serving cell and a current PDCCH monitoring occasion in the first time window, first in ascending order of serving cell index and second in ascending order of PDCCH monitoring occasion index;

a total number of {serving cell, PDCCH monitoring occasion}-pair(s) comprising DCI of a target format up to a current PDCCH monitoring occasion in the first time window.

* * * * *